United States Patent
Chin et al.

(10) Patent No.: US 12,114,390 B2
(45) Date of Patent: Oct. 8, 2024

(54) METHOD AND APPARATUS FOR HANDLING RANDOM ACCESS FAILURES IN RRC INACTIVE STATE

(71) Applicant: FG Innovation Company Limited, Tuen Mun (HK)

(72) Inventors: Heng-Li Chin, Taipei (TW); Hsin-Hsi Tsai, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 352 days.

(21) Appl. No.: 17/739,505

(22) Filed: May 9, 2022

(65) Prior Publication Data
US 2022/0361279 A1 Nov. 10, 2022

Related U.S. Application Data

(60) Provisional application No. 63/185,986, filed on May 7, 2021.

(51) Int. Cl.
| H04W 76/27 | (2018.01) |
| H04W 24/04 | (2009.01) |
| H04W 74/0833 | (2024.01) |

(52) U.S. Cl.
CPC ........... *H04W 76/27* (2018.02); *H04W 24/04* (2013.01); *H04W 74/0833* (2013.01)

(58) Field of Classification Search
CPC . H04W 76/27; H04W 24/04; H04W 74/0833; H04W 74/0825
See application file for complete search history.

(56) References Cited

U.S. PATENT DOCUMENTS

| 2016/0249155 A1 | 8/2016 | Anev et al. |
| 2018/0220369 A1 | 8/2018 | Wu |
| 2018/0302914 A1 | 10/2018 | da Silva et al. |
| 2020/0053791 A1 | 2/2020 | Ozturk et al. |

(Continued)

FOREIGN PATENT DOCUMENTS

| CN | 109952747 A | 6/2019 |
| WO | 2019136631 A1 | 7/2019 |

OTHER PUBLICATIONS

3GPP TS 38.300, "3rd Generation Partnership Project; Technical Specification Group Radio Access Network; NR; NR and NG-RAN Overall Description; Stage 2 (Release 16)", Technical Specification, V16.2.0 (Jul. 2020).

(Continued)

*Primary Examiner* — Hashim S Bhatti
(74) *Attorney, Agent, or Firm* — ScienBiziP, P.C.

(57) ABSTRACT

A method performed by a user equipment (UE) for wireless communication is provided. The method includes initiating a random access (RA)-based small data transmission (SDT) procedure while the UE is in a radio resource control (RRC) inactive state; starting a timer while the UE is in the RRC inactive state after initiating the RA-based SDT procedure; initiating an RA procedure; determining whether an RA problem associated with the RA procedure has occurred while the timer is running; and in response to determining that the RA problem of the RA procedure has occurred while the timer is running, transitioning from the RRC inactive state to an RRC idle state.

14 Claims, 6 Drawing Sheets

(56) References Cited

U.S. PATENT DOCUMENTS

| | | | |
|---|---|---|---|
| 2023/0225004 A1* | 7/2023 | Wang | H04W 76/27 |
| | | | 370/328 |
| 2023/0284289 A1* | 9/2023 | Watts | H04W 48/20 |
| | | | 370/329 |
| 2024/0032134 A1* | 1/2024 | Kim | H04W 76/20 |
| 2024/0057204 A1* | 2/2024 | Zhang | H04W 76/27 |
| 2024/0073987 A1* | 2/2024 | Kim | H04W 76/38 |
| 2024/0098797 A1* | 3/2024 | Liu | H04W 74/0833 |

OTHER PUBLICATIONS

3GPP TS 38.214, "3rd Generation Partnership Project; Technical Specification Group Radio Access Network; NR; Physical layer procedures for data (Release 16)", Technical Specification, V16.3.0 (Sep. 2020).

3GPP TS 38.321, "3rd Generation Partnership Project; Technical Specification Group Radio Access Network; NR; Medium Access Control (MAC) protocol specification (Release 16)", Technical Specification, V16.2.0 (Sep. 2020).

3GPP TS 38.331, "3rd Generation Partnership Project; Technical Specification Group Radio Access Network; NR; Radio Resource Control (RRC) protocol specification (Release 16)", Technical Specification, V16.2.0 (Sep. 2020).

* cited by examiner

… (1)

METHOD AND APPARATUS FOR HANDLING RANDOM ACCESS FAILURES IN RRC INACTIVE STATE

CROSS-REFERENCE TO RELATED APPLICATION(S)

The present disclosure claims the benefit of and priority to U.S. Provisional Patent Application Ser. No. 63/185,986, filed on May 7, 2021, entitled "METHOD AND APPARATUS TO PERFORM FALLBACK IN RRC_INACTIVE," the content of which is hereby incorporated herein fully by reference into the present disclosure for all purposes.

FIELD

The present disclosure generally relates to wireless communications and, more specifically, to handling random access (RA) failures in a user equipment (UE) that is in a radio resource control (RRC) inactive state.

BACKGROUND

With the tremendous growth in the number of connected devices and the rapid increase in user/network traffic volume, various efforts have been made to improve different aspects of wireless communication for the next-generation wireless communication systems, such as the fifth-generation (5G) New Radio (NR), by improving data rate, latency, reliability, and mobility in these systems.

The 5G NR system is designed to provide flexibility and configurability to optimize the network services and types, accommodating various use cases, such as enhanced Mobile Broadband (eMBB), massive Machine-Type Communication (mMTC), and Ultra-Reliable and Low-Latency Communication (URLLC).

However, as the demand for radio access continues to increase, there exists a need for further improvements in the art, such as improvements in handling the RA failures in a wireless communication system.

SUMMARY

The present disclosure is directed to methods and apparatus for handling random access (RA) failures in a radio resource control (RRC) inactive state.

In a first aspect of the present application, a method performed by a UE is provided. The method includes: initiating a random access (RA)-based small data transmission (SDT) procedure while the UE is in an RRC inactive state; starting a timer while the UE is in the RRC inactive state after initiating the RA-based SDT procedure; initiating an RA procedure; determining whether an RA problem associated with the RA procedure has occurred while the timer is running; and in response to determining that the RA problem of the RA procedure has occurred while the timer is running, transitioning from the RRC inactive state to an RRC idle state.

In an implementation of the first aspect, the method further includes stopping the timer when receiving at least one of an RRC resume message, an RRC setup message, an RRC release message, and an RRC reject message.

In another implementation of the first aspect, starting the timer includes starting the timer upon transmitting at least one of an RRC resume request message and an RRC resume request 1 message, and when a resume procedure is initiated for an SDT.

In another implementation of the first aspect, transmitting the at least one of the RRC resume request message and the RRC resume request 1 message includes transmitting the at least one of the RRC resume request message and the RRC resume request 1 message with an Msg3 payload or an MSGA payload.

In another implementation of the first aspect, the method further includes transitioning from the RRC inactive state to an RRC idle state upon an expiry of the timer.

In another implementation of the first aspect, determining whether the RA problem associated with the RA procedure has occurred while the timer is running includes determining whether a number of RA preamble transmissions during the RA procedure exceeds a threshold while the timer is running.

In another implementation of the first aspect, the method further includes sending an RA problem indication from a MAC layer of the UE to an RRC layer of the UE in a case that the number of RA transmissions preamble exceeds the threshold.

In a second aspect of the present disclosure, a UE is provided. The UE includes at least one processor, and at least one memory coupled to the at least one processor. The at least one memory stores a set of computer-executable instructions that, when executed by the at least one processor, causes the UE to: initiate an RA-based SDT procedure while the UE is in an RRC inactive state; start a timer while the UE is in the RRC inactive state after initiating the RA-based SDT procedure; initiate an RA procedure; determine whether an RA problem associated with the RA procedure has occurred while the timer is running; and in response to determining that the RA problem associated with the RA procedure has occurred while the timer is running, transition from the RRC inactive state to an RRC idle state.

In an implementation of the second aspect, the set of computer-executable instructions, when executed by the at least one processor, further cause the UE to stop the timer when receiving at least one of an RRC resume message, an RRC setup message, an RRC release message, and an RRC reject message.

In another implementation of the second aspect, starting the timer includes starting the timer upon transmitting at least one of an RRC resume request message and an RRC resume request 1 message and when a resume procedure is initiated for an SDT.

In another implementation of the second aspect, transmitting the at least one of the RRC resume request message and the RRC resume request 1 message includes transmitting the at least one of the RRC resume request message and the RRC resume request 1 message with an Msg3 payload or an MSGA payload.

In another implementation of the second aspect, the set of computer-executable instructions, when executed by the at least one processor, further cause the UE to transition from the RRC inactive state to an RRC idle state upon an expiry of the timer.

In another implementation of the second aspect, determining whether the RA problem associated with the RA procedure has occurred while the timer is running includes determining whether a number of RA preamble transmissions during the RA procedure exceeds a threshold while the timer is running.

In another implementation of the second aspect, the set of computer-executable instructions, when executed by the at least one processor, further cause the UE to send an RA problem indication from a MAC layer of the UE to an RRC layer of the UE in a case that the number of RA preamble transmissions exceeds the threshold.

In a third aspect of the present disclosure, a method performed by a UE is provided. The method includes: initiating an RA-based SDT procedure while the UE is in an RRC inactive state; initiating an RA procedure; in response to identifying an RA problem associated with the RA procedure, determining whether the RA-based SDT procedure has failed; and in response to determining that the RA-based SDT procedure has failed, performing at least one of one or more actions for the failure of the RA-based SDT procedure, wherein the one or more actions for the failure of the RA-based SDT procedure includes transitioning from the RRC inactive state to an RRC idle state.

In an implementation of the third aspect, the method further includes: starting a timer while the UE is in the RRC inactive state after initiating the RA-based SDT procedure, wherein determining that the RA-based SDT procedure has failed includes determining that the RA-based SDT procedure has failed in a case that the timer is expired, or the RA problem is identified while the timer is running.

In another implementation of the third aspect, the method further includes stopping the timer when receiving at least one of an RRC resume message, an RRC setup message, an RRC release message, and an RRC reject message.

In another implementation of the third aspect, starting the timer includes starting the timer upon transmitting at least one of an RRC resume request message and an RRC resume request 1 message when a resume procedure is initiated for an SDT.

In another implementation of the third aspect, the method further includes sending an RA-based SDT procedure failure indication from a MAC layer of the UE to an RRC layer of the UE upon determining that the RA-based SDT procedure has failed.

In another implementation of the third aspect, the one or more actions for the failure of the RA-based SDT procedure further includes: stopping the RA procedure; and terminating the RA-based SDT procedure.

BRIEF DESCRIPTION OF THE DRAWINGS

Aspects of the present disclosure are best understood from the following detailed description when read with the accompanying figures. Various features are not drawn to scale. Dimensions of various features may be arbitrarily increased or reduced for clarity of discussion.

DESCRIPTION

Figure 1:
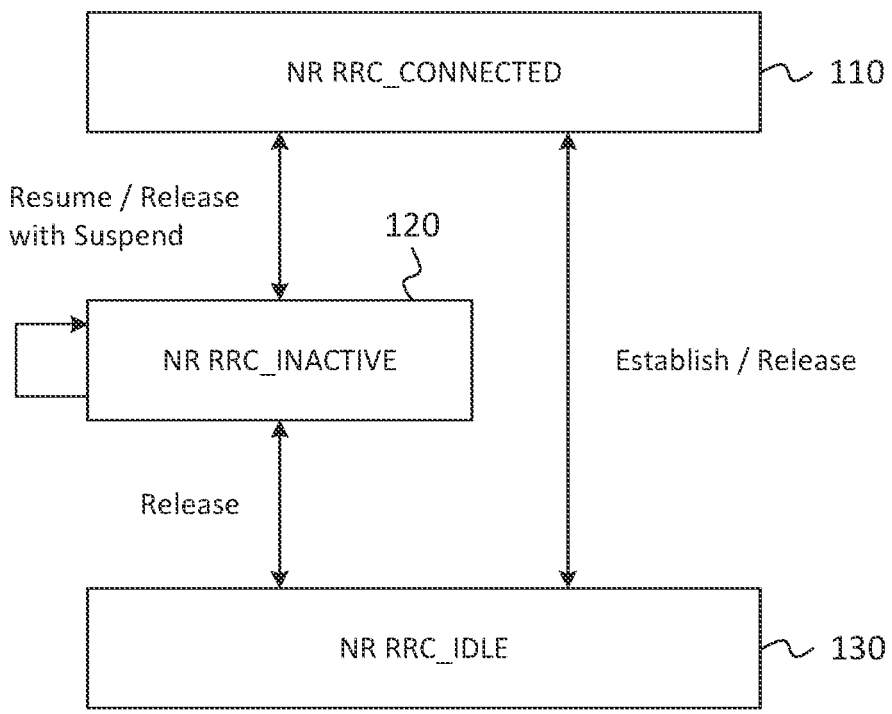
FIG. 1 is a diagram illustrating a radio resource control (RRC) state machine for a user equipment (UE) in new radio (NR), according to an example implementation of the present disclosure.

Some of the terms mentioned in the present disclosure are defined as follows.

| Abbreviation | Full name |
| --- | --- |
| AS | Access Stratum |
| BI | Backoff Indicator |
| BS | Base Station |
| BWP | Bandwidth Part |
| CCCH | Common Control Channel |
| CE | Control Element |
| CG | Configured Grant |
| CN | Core Network |
| CORESET | Control Resource Set |
| C-RNTI | Cell-Radio Network Temporary Identifier |
| CSI | Channel State Information |
| CS-RNTI | Configured Scheduling-Radio Network Temporary Identifier |
| CSS | Common Search Space |
| DCI | Downlink Control Information |
| DFI | Downlink Feedback Indication |
| DL | Downlink |
| DRB | Data Radio Bearer |
| DRX | Discontinuous Reception |
| HARQ | Hybrid Automatic Repeat Request |
| IE | Information Elements |
| I-RNTI | Inactive- Radio Network Temporary Identifier |
| LCH | Logical Channel |
| LCG | Logical Channel Group |
| MAC | Medium Access Control |
| MCG | Master Cell Group |
| NUL | Normal Uplink |
| NW | Network |
| PCell | Primacy Cell |
| PDCCH | Physical Downlink Control Channel |
| PDSCH | Physical Downlink Shared Channel |
| PHY | Physical Layer |
| PRACH | Physical Random Access Channel |
| PS | Power Saving |
| PUCCH | Physical Uplink Control Channel |
| PUSCH | Physical Uplink Shared Channel |
| RA | Random Access |
| RAPID | Random Access Preamble Identifier |
| RAR | Random Access Response |
| RB | Radio Bearer |
| Rel | Release |
| RLF | Radio Link Failure |
| RNAU | RAN-based Notification Area Update |
| RNTI | Radio Network Temporary Identifier |
| RRC | Radio Resource Control |
| RSRP | Reference Signal Received Power |
| SCell | Secondary Cell |
| SCG | Secondary Cell Group |
| SDT | Small Data Transmission |
| SR | Scheduling Request |
| SRB | Signaling Radio Bearer |
| SS | Search Space |
| SSB | Synchronization Signal (and Physical Broadcast Channel) block |
| SUL | Supplementary Uplink |
| TA | Timing Advance |
| TBS | Transport Block Size |
| UE | User Equipment |
| UL | Uplink |

The following contains specific information pertaining to example implementations in the present disclosure. The drawings and their accompanying detailed disclosure are directed to merely example implementations of the present disclosure. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For consistency and ease of understanding, like features are identified (although, in some examples, not illustrated) by numerals in the example figures. However, the features in different implementations may differ in other respects, and thus shall not be narrowly confined to what is illustrated in the figures.

References to "one implementation," "an implementation," "example implementation," "various implementations," "some implementations," "implementations of the present disclosure," etc., may indicate that the implementation(s) of the present disclosure may include a particular feature, structure, or characteristic, but not every possible implementation of the present disclosure necessarily includes the particular feature, structure, or characteristic. Further, repeated use of the phrase "In some implementations," "in an example implementation," or "an implementation," do not necessarily refer to the same implementation, although they may. Moreover, any use of phrases like "implementations" in connection with "the present disclosure" are never meant to characterize that all implementations of the present disclosure must include the particular feature, structure, or characteristic, and should instead be understood to mean "at least some implementations of the present disclosure" includes the stated particular feature, structure, or characteristic. The term "coupled" is defined as connected, whether directly or indirectly through intervening components, and is not necessarily limited to physical connections. The term "comprising," when utilized, means "including but not necessarily limited to"; it specifically indicates open-ended inclusion or membership in the disclosed combination, group, series, and the equivalent. The terms "system" and "network" in the present disclosure may be used interchangeably.

The term "and/or" herein is only an association relationship for describing associated objects and represents that three relationships may exist, for example, A and/or B may represent that: A exists alone, A and B exist at the same time, and B exists alone. "A and/or B and/or C" may represent that at least one of A, B, and C exists. The character "/" used herein generally represents that the former and latter associated objects are in an "or" relationship.

Additionally, for a non-limiting explanation, specific details, such as functional entities, techniques, protocols, standards, and the like, are set forth for providing an understanding of the disclosed technology. In other examples, detailed disclosure of well-known methods, technologies, systems, architectures, and the like are omitted so as not to obscure the present disclosure with unnecessary details.

Persons skilled in the art will immediately recognize that any network function(s) or algorithm(s) may be implemented by hardware, software, or a combination of software and hardware. Disclosed functions may correspond to modules that may be software, hardware, firmware, or any combination thereof. The software implementation may comprise computer-executable instructions stored on a computer-readable medium such as memory or other types of storage devices. For example, one or more microprocessors or general-purpose computers with communication processing capability may be programmed with corresponding executable instructions and carry out the disclosed network function(s) or algorithm(s). The microprocessors or general-purpose computers may be formed of Applications Specific Integrated Circuitry (ASIC), programmable logic arrays, and/or using one or more Digital Signal Processors (DSPs). Although some of the example implementations disclosed are oriented to software installed and executing on computer hardware, alternative example implementations implemented as firmware or as hardware or combination of hardware and software are well within the scope of the present disclosure.

The computer-readable medium may include, but is not limited to, Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long-Term Evolution (LTE) system, an LTE-Advanced (LTE-A) system, or an LTE-Advanced Pro system) may typically include at least one Base Station (BS), at least one UE, and one or more optional network elements that provide connection towards a network. The UE may communicate with the network (e.g., a Core Network (CN), an Evolved Packet Core (EPC) network, an Evolved Universal Terrestrial Radio Access Network (E-UTRAN), a Next-Generation Core (NGC), or an Internet), through a Radio Access Network (RAN) established by the BS.

In the present disclosure, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a Personal Digital Assistant (PDA) with wireless communication capability. The UE may be configured to receive and transmit signals over an air interface to one or more cells in a RAN.

A BS may include, but is not limited to, a Node B (NB) as in the Universal Mobile Telecommunication System (UMTS), an evolved Node B (eNB) as in the LTE-A, a Radio Network Controller (RNC) as in the UMTS, a Base Station Controller (BSC) as in the Global System for Mobile communications (GSM)/GSM Enhanced Data rates for GSM Evolution (EDGE) Radio Access Network (GERAN), a next-generation eNB (ng-eNB) as in an Evolved Universal Terrestrial Radio Access (E-UTRA) BS in connection with the 5GC, a next-generation Node B (gNB) as in the 5G Access Network (5G-AN), and any other apparatus capable of controlling radio communication and managing radio resources within a cell. The BS may connect to serve the one or more UEs through a radio interface to the network.

A BS may be configured to provide communication services according to at least one of the following Radio Access Technologies (RATs): Worldwide Interoperability for Microwave Access (WiMAX), GSM (often referred to as 2G), GERAN, General Packet Radio Service (GPRS), UMTS (often referred to as 3G) based on basic Wideband-Code Division Multiple Access (W-CDMA), High-Speed Packet Access (HSPA), LTE, LTE-A, enhanced LTE (eLTE), NR (often referred to as 5G), and LTE-A Pro. However, the scope of the present disclosure should not be limited to the protocols mentioned above.

The BS may be operable to provide radio coverage to a specific geographical area using a plurality of cells included in the RAN. The BS may support the operations of the cells.

Each cell may be operable to provide services to at least one UE within its radio coverage. More specifically, each cell (often referred to as a serving cell) may provide services to serve one or more UEs within its radio coverage (e.g., each cell schedules the Downlink (DL) and optionally Uplink (UL) resources to at least one UE within its radio coverage for DL and optionally UL packet transmissions). The BS may communicate with one or more UEs in the radio communication system through the plurality of cells. A cell may allocate Sidelink (SL) resources for supporting Proximity Service (ProSe), LTE SL services, and LTE/NR Vehicle-to-Everything (V2X) services. Each cell may have overlapped coverage areas with other cells. In Multi-RAT Dual Connectivity (MR-DC) cases, the primary cell of a Master Cell Group (MCG) or a Secondary Cell Group (SCG) may be referred to as a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), including the SpCell and optionally one or more Secondary Cells (SCells). An SCG may refer to a group of serving cells associated with the Secondary Node (SN), including the SpCell and optionally one or more SCells.

As discussed above, the frame structure for NR is to support flexible configurations for accommodating various next-generation (e.g., 5G) communication requirements, such as eMBB, mMTC, and URLLC, while fulfilling high reliability, high data rate, and low latency requirements. The orthogonal frequency-division multiplexing (OFDM) technology, as agreed in the 3d Generation Partnership Project (3GPP), may serve as a baseline for an NR waveform. The scalable OFDM numerology, such as the adaptive sub-carrier spacing, the channel bandwidth, and the cyclic prefix (CP), may also be used. Additionally, two coding schemes are considered for NR. (1) low-density parity-check (LDPC) code and (2) polar code. The coding scheme adaption may be configured based on the channel conditions and/or the service applications.

Moreover, it is also considered that in a transmission time interval of a single NR frame, at least DL transmission data, a guard period, and UL transmission data should be included, where the respective portions of the DL transmission data, the guard period, the UL transmission data should also be configurable, for example, based on the network dynamics of NR. Besides, an SL resource may also be provided in an NR frame to support ProSe services.

According to 3GPP Technical Specification (TS) 38.300, a UE is either in an RRC_CONNECTED state or in an RRC_INACTIVE state when an RRC connection has been established. If this is not the case, e.g., no RRC connection has been established, the UE may be in an RRC_IDLE state.

A UE in the RRC_IDLE state may perform the following actions:
  UE specific DRX may be configured.
  UE controlled mobility may be configured based on network configuration.
  Short Messages transmitted with P-RNTI over DCI may be monitored.
  A Paging channel for CN paging using 5G-S-TMSI may be monitored.
  Neighboring cell measurements and cell (re)selection may be performed.
  System information may be acquired, and an SI request (if configured) may be sent.

A UE in the RRC_INACTIVE state may perform the following actions:
  UE specific DRX may be configured.
  UE controlled mobility may be configured based on network configuration.
  UE may store the UE Inactive AS context.
  A RAN-based notification area may be configured by an RRC layer.
  Short Messages transmitted with P-RNTI over DCI may be monitored.
  A Paging channel for CN paging using 5G-S-TMSI and RAN paging using full I-RNTI may be configured.
  Neighboring cell measurements and cell (re)selection may be performed.
  RAN-based notification area updates may be performed periodically (and/or when moving outside the configured RAN-based notification area).
  System information may be acquired, and an SI request (if configured) may be sent.

A UE in the RRC_CONNECTED may perform the following actions:
  UE may store the AS context.
  Transfer of unicast data to/from another UE.
  UE specific DRX may be configured.
  For UEs supporting CA, use of one or more SCells, the UEs may be aggregated with the SpCell for increasing the BW.
  For UEs supporting DC, use of one SCG, the UEs may be aggregated with the MCG for increasing the BW and improving the spatial diversity.
  Network controlled mobility within NR and to/from E-UTRA may be supported, including handover between NR cells and handover from NR/E-UTRA cell to a E-UTRA/NR cell.
  Short Messages transmitted with P-RNTI over DCI, if configured, may be monitored.
  Control channels associated with the shared data channel to determine if data is scheduled for it may be monitored.
  Channel quality and feedback information may be provided.
  Neighboring cell measurements and measurement reporting may be performed.
  System information may be acquired.

FIG. 1 is a diagram illustrating an RRC state machine for a UE in NR, according to an example implementation of the present disclosure.

Referring to FIG. 1, a UE may have only one of the RRC states in NR at a time. The RRC states may include an RRC_CONNECTED state 110, an RRC_INACTIVE state 120, and an RRC_IDLE state 130.

A network initiates an RRC connection release procedure by sending an RRCRelease message (with suspendConfig) to the UE. This procedure (e.g., initiating the RRC connection release procedure) may be initiated for one or more of the following purposes:
  Transitioning the UE that is in the RRC_CONNECTED state 110 to the RRC_IDLE state 130.
  Transitioning the UE that is in the RRC_CONNECTED state to 110 the RRC_INACTIVE state 120 (e.g., only if SRB2 and at least one DRB is setup in the RRC_CONNECTED state 110).
  Keeping the UE that is in the RRC_INACTIVE state 120 in the same state when the UE tries to resume the connection.

Transitioning the UE that is in the RRC_INACTIVE state 120 to the RRC_IDLE state 130 when the UE tries to resume.

Specifically, the network may send an RRCRelease message without suspendConfig to transition the UE from the RRC_CONNECTED/RRC_INACTIVE state 110/120 to the RRC_IDLE state 130. Conversely, the network may send an RRCRelease message with suspendConfig to transition the UE from the RRC_CONNECTED/RRC_INACTIVE state 110/120 to the RRC_INACTIVE state 120.

Upon reception of an RRCRelease message with suspendConfig from the network, the UE may, for example, perform one or more of the following actions:
- apply the received suspendConfig;
- reset the MAC entity and release the default MAC Cell Group configuration, if any;
- re-establish the RLC entities for SRB1;
- suspend all SRB(s) and DRB(s), except SRB0;
- indicate the PDCP suspension to the lower layers of all DRBs;
- indicate the suspension of the RRC connection to the upper layers;
- enter the RRC_INACTIVE state 120 and perform cell (re)selection (e.g., as specified in 3GPP TS 38.331).

The suspendConfig IE may, for example, include, but not limited to, the following IEs:
- fullI-RNTI/shortI-RNTI: used to identify the suspended UE context of a UE in the RRC_INACTIVE state 120.
- ran-PagingCycle: refers to the UE specific cycle for RAN-initiated paging. Value rf32 corresponds to 32 radio frames, value rf64 corresponds to 64 radio frames, and so on.
- ran-NotificationAreaInfo: network ensures that the UE in the RRC_INACTIVE state 120 always has a valid ran-NotificationAreaInfo.
- t380: refers to the timer that triggers the periodic RNAU procedure in UE. Value min5 corresponds to 5 minutes, value min10 corresponds to 10 minutes, and so on.

In NR Rel-15 and Rel-16, the network may allocate uplink resources for the initial transmissions to the UEs in the RRC_CONNECTED state 110 via configured uplink grant (e.g., as specified in 3GPP TS 38.321). In general, there are two types of configured uplink grants:
- configured grant (CG) Type 1, where an uplink grant is provided by an RRC signaling and stored as a configured uplink grant.
- CG Type 2, where an uplink grant is provided by a PDCCH and stored or cleared as a configured uplink grant based on L1 signaling indicating a configured uplink grant activation or deactivation.

CG Type 1 and Type 2 are configured by an RRC signaling per Serving Cell and per BWP. Multiple configurations may be active simultaneously on the same serving cells/BWPs. For the CG Type 2, activation and deactivation may be independent among the Serving Cells. For the same Serving Cell/BWP, the MAC entity may be configured with both CGs Type 1 and Type 2.

The RRC signaling may configure the following parameters when the CG Type 1 is configured:
- cs-RNTI: CS-RNTI for retransmission;
- periodicity: periodicity of the CG Type 1;
- timeDomainOffset: offset of a resource with respect to SFN=0 in the time domain;
- timeDomainAllocation: allocation of configured uplink grant in the time domain which contains startSymbolAndLength (e.g., SLIV as specified in 3GPP TS 38.214); and
- nrofHARQ-Processes: the number of HARQ processes for the CG.

The RRC signaling may configure the following parameters when the CG Type 2 is configured:
- cs-RNTI: CS-RNTI for retransmission;
- periodicity: periodicity of the CG Type 2; and
- nrofHARQ-Processes: the number of HARQ processes for CG.

Upon configuration of a CG Type 1 for a Serving Cell (e.g., via upper layers), the MAC entity may:
- store the uplink grant provided by upper layers as a configured uplink grant for the indicated Serving Cell; and
- initialize or re-initialize the configured uplink grant to start in the symbol according to timeDomainOffset and S (derived from SLIV as specified in 3GPP TS 38.214), and to reoccur with periodicity.

Figure 2:
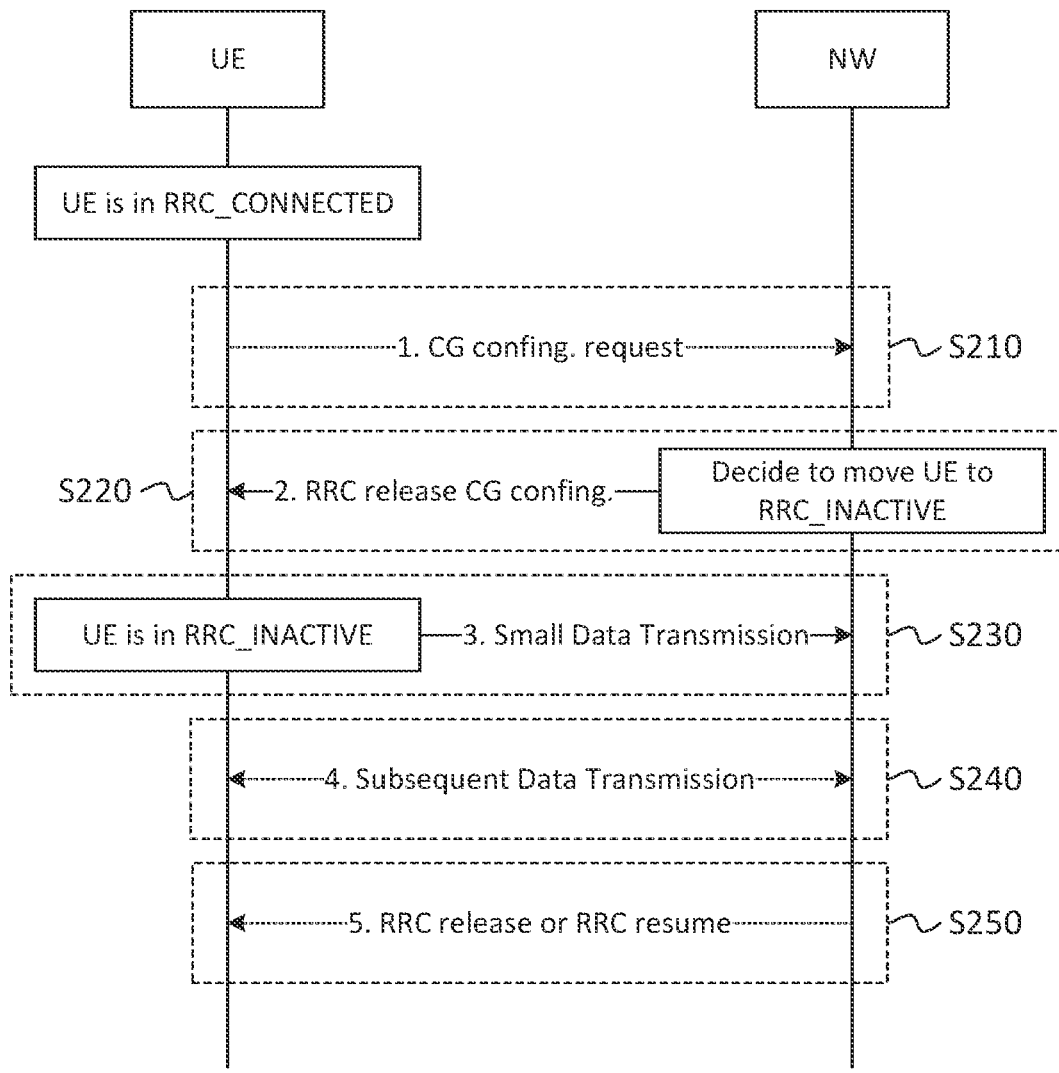
FIG. 2 is a diagram illustrating a configured grant (CG)-based small data transmission (SDT) procedure, according to an example implementation of the present disclosure.

FIG. 2 is a diagram illustrating a CG-based small data transmission (SDT) procedure, according to an example implementation of the present disclosure.

It should be noted that the order of the steps/actions in FIG. 2 may be changed according to different implementations. For example, step S220 may occur before step S210, etc. In some implementations of the present disclosure, a CG-based SDT procedure may include steps S230, S240, and S250. In some implementations of the present disclosure, the subsequent data transmission phase of the CG-based SDT procedure may occur after step S230 and before step S250.

Referring to FIG. 2, in step S210, while the UE is in the RRC_CONNECTED state, the UE may send a CG configuration request to the network to indicate its preference on configuration with CG type 1 for the RRC_INACTIVE state.

In step S220, the NW may decide to move the UE to the RRC_INACTIVE state by sending an RRCRelease (with suspendconfig) message to the UE. The RRC release message (e.g., RRCRelease message) may include a CG configuration to configure CG resources to the UE. Alternatively, the CG configuration may be provided in an RRC reconfiguration message while the UE is in the RRC_CONNECTED state. The CG configuration (e.g., ConfiguredGrantConfig) may, include, but is not limited to, the following information:
- CG periodicity;
- TBS;
- Number for the implicit release of the CG resources;
- CG Timer (e.g., configuredGrantTimer);
- Retransmission timer (e.g., cg-Retransmission Timer);
- Number of HARQ process reserved for CG in SDT;
- RSRP threshold for SSB selection and association between SSB and CG resources; and
- TA related parameters (e.g., TA timer).

In step S230, the UE may perform an SDT via a CG resource in the RRC_INACTIVE state, according to the CG configuration (e.g., configured in step S220). Moreover, an RRC resume request message (e.g., RRCResumeRequest message) may be sent to the network.

After the first UL transmission on the CG resource in the CG-based SDT procedure (e.g., step S230), in step S240, subsequent data transmission may be the transmission of multiple UL and/or DL packets as part of the same CG-based SDT procedure and without transitioning to the RRC_CONNECTED state (e.g., the UE is still in the RRC_INACTIVE state). The UE may monitor PDCCH(s) via a specific RNTI (e.g., C-RNTI) to receive the dynamic scheduling for UL and/or DL new transmission and/or the corresponding retransmission. The UE may monitor PDCCH(s) via a UE specific RNTI (e.g., C-RNTI) to receive the dynamic scheduling for the retransmission of CG type 1. The UE may perform subsequent data transmission via CG, according to the CG configuration (e.g., configured in step S220).

In step S250, for terminating the CG-based SDT procedure, the network may send an RRC release message to keep the UE in the RRC_INACTIVE state or move the UE to the RRC_IDLE state. Alternatively, the network may send an RRC resume message to move the UE to the RRC_CONNECTED state.

Figure 3:
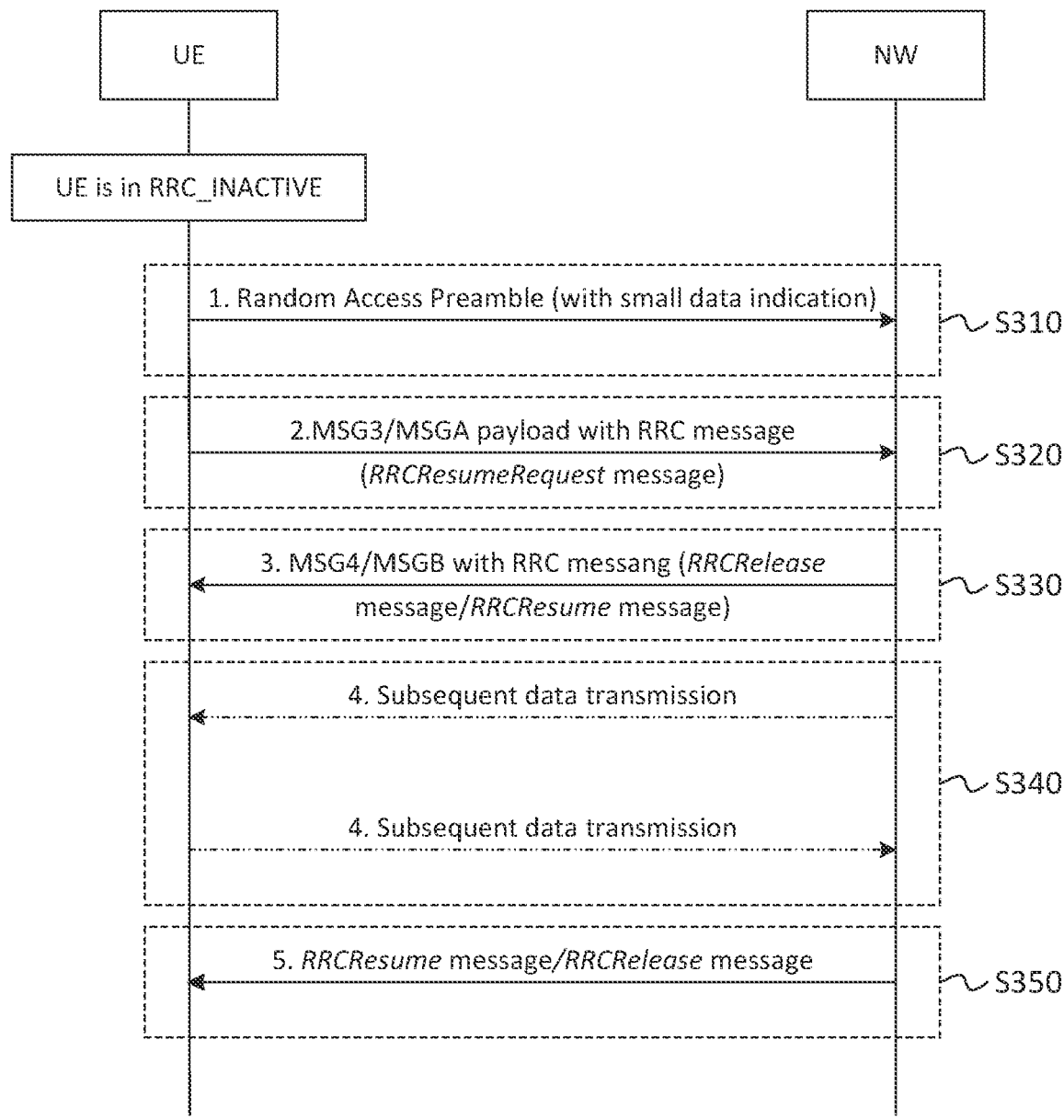
FIG. 3 is a diagram illustrating a random access (RA)-based SDT procedure, according to an example implementation of the present disclosure.

FIG. 3 is a diagram illustrating a random access (RA)-based SDT procedure, according to an example implementation of the present disclosure.

It should be noted that the order of the steps in FIG. 3 may be different according to different implementations. For example, step S320 may happen before step S310, and so on. It should be further noted that step S310, step S320, and step S330 may also be referred to as an RA procedure that is initiated as part of the RA-based SDT procedure. In some implementations of the present disclosure, the subsequent data transmission phase of the RA-based SDT procedure may occur after step S330 and before step S350.

Referring to FIG. 3, in step S310, when a UE that is in the RRC_INACTIVE state has UL data available for transmission, it may initiate an RA-based SDT procedure for the transmission of the UL data. As part of the RA-based SDT procedure, the UE may initiate an RA procedure, which may include selection of either a 4-step RA type or a 2-step RA type for the RA procedure. Moreover, the PRACH resource for this RA procedure (e.g., RA preamble with small data indication) may be different from the PRACH resource for a normal RA procedure (e.g., RA preamble without small data indication). Here, the UE may select the PRACH resource (for the purpose of SDT) for the RA procedure as part of the RA-based SDT procedure. Upon selection of the PRACH resource corresponding to the selected RA type (e.g., 4-step RA type or 2-step RA type), the UE may transmit an RA preamble on the selected PRACH resource in step S310.

After transmitting the RA preamble in step S310, the UE may transmit an RRC message through MSG3 (when the 4-step RA type is selected) or MSGA (when the 2-step RA type is selected) in step S320. The RRC message may be an RRC resume request message (e.g., RRCResumeRequest). In addition for the RRC message, MAC CE (e.g., BSR) and DRB/SRB data packet (e.g., small data) may be included in the MSG3/MSGA as well.

Once MSG3/MSGA is transmitted, in step S330, the UE may monitor RA-RNTI/MSGB-RNTI for MSG4/MSGB, in which the contention resolution ID may be carried. In addition, MAC CE (e.g., BSR) and DRB data packet (e.g., small data) may be included in MSG4/MSGB as well. In a case that the UE receives MSG4/MSGB, the RA procedure (as part of the RA-based SDT procedure) may successfully be completed.

In addition, the network may transmit an RRC message in MSG4/MSGB. The RRC message may be an RRC release message (e.g., RRCRelease) with suspendConfig IE or an RRC resume message (e.g., RRCResume). The UE may stay in the RRC_INACTIVE state if it receives an RRCRelease message with suspendConfig IE, or may enter the RRC_CONNECTED state if it receives an RRCResume message. In a case that the UE receives MSG4/MSGB including the RRC release message with suspendConfig IE, or the RRC resume message, and the contention resolution is successful, the RA procedure may be successfully completed and the RA-based SDT procedure may be completed, in which case steps S340 and S350 may not be happening.

In a case that the RA procedure, as part of an RA-based SDT procedure, is successfully completed (e.g., the contention resolution of the RA procedure, as part of the RA-based SDT procedure, is successful) and the RA-based SDT procedure has not been completed (e.g., MSG4/MSGB is received without the RRC release message with suspendConfig IE or the RRC resume message), for example, in step S330, the UE may monitor, in step S340, a specific RNTI (e.g., C-RNTI) for subsequent data transmission. The subsequent data transmission may be include transmission of multiple UL and/or DL packets as part of the same SDT mechanism without transitioning to the RRC_CONNECTED state (e.g., the UE is still in the RRC_INACTIVE state). The UE may monitor (specific) PDCCH(s) via a specific RNTI (e.g., C-RNTI) to receive the dynamic scheduling for UL and/or DL new transmission and/or the corresponding retransmission. The UE may monitor (specific) PDCCH(s) via a UE specific RNTI (e.g., C-RNTI) to receive the dynamic scheduling for the retransmission of CG type 1, dynamic scheduling of PUSCH for new UL transmission, dynamic scheduling of PDSCH for new DL reception, dynamic scheduling of PDSCH for DL retransmission, etc. Step S340 may also be referred to as a subsequent data transmission phase of the RA-based SDT procedure.

In step S350, the RRCRelease message (with suspendConfig IE) is received, and the UE may stop monitoring the specific RNTI (e.g., C-RNTI) on the (specific) PDCCH(s). It should be noted that the RRCRelease message may be received in MSG4/MSGB in step S330 or a PDSCH indicated by a dynamic scheduling in step S350. It also should be noted that in step S350, the RRCRelease message (with suspendConfig IE) may be replaced with an RRCResume message. In this case, the UE may also stop monitoring the UE-specific RNTI (e.g., C-RNTI) on the (specific) PDCCH. The RA-based SDT procedure may be completed upon reception of the RRCRelease message (with suspendConfig IE) or the RRCResume message in step S350.

A UE in an RRC_INACTIVE state may receive a fallback indication from the network and/or satisfies a specific fallback condition(s). In some implementations, the fallback indication may be received, and/or the specific fallback condition(s) may be met, during an ongoing CG-/RA-based SDT procedure. In some implementations, the fallback indication may be received, and/or the specific fallback condition(s) may be met, during a subsequent data transmission phase that corresponds to an ongoing CG-/RA-based SDT procedure. Once the UE receives the fallback indication, and/or satisfies the specific condition(s), it may perform a normal RA procedure and/or a normal RRC connection resume procedure. Moreover, the UE may stop the ongoing CG-/RA-based SDT procedure and/or initiates a normal RA procedure/RRC connection resume procedure. Detailed UE behaviors after receiving the fallback indication, signaling designs of the fallback indication, and details of the specific fallback condition(s) are described in the following paragraphs.

In some implementations, a UE may initiate a 2-step/4-step RA procedure which may be initiated as part of an RA-based SDT procedure (e.g., as illustrated in FIG. 3) if at least one of a set of criteria (which will be described below) is satisfied. In some scenarios (e.g., scenario 1 described below), while the 2-step RA procedure is ongoing, the UE may receive a fallback indication from the network. In some scenarios (e.g., scenario 2 described below), while the 4-step RA procedure is ongoing, the UE may receive a fallback indication from the network. In some scenarios (e.g., scenario 3 described below), the UE may receive a fallback indication from the network after the 2-step/4-step RA procedure has been (successfully) completed and while the RA-based SDT procedure is still ongoing (e.g., reception of a fallback indication from the network during a subsequent data transmission phase).

The UE may perform at least one of the fallback actions (which will be described below) after receiving the fallback indication from the network. In some implementations, the UE may perform at least one of the fallback actions only if the fallback indication is considered valid. In other words, the UE may not perform a fallback action if the fallback indication is considered invalid.

Example scenarios of fallback indication during an ongoing RA-based SDT procedure are described below.

Scenario 1: Reception of a fallback indication while a 2-step RA procedure, which is initiated as part of an RA-based SDT procedure, is still ongoing.

In some implementations, a UE may initiate a 2-step RA procedure as part of the RA-based SDT procedure. The 2-step RA procedure may include an MSGA transmission and an MSGB/RAR (MAC PDU) reception. In some implementations, the MSGA transmission may include transmission of an RA preamble for the SDT (e.g., an RA preamble with an SDT indication) and transmission of an MSGA payload. In some implementations, the MSGA payload may include CCCH data (e.g., RRCResumeRequest message), C-RNTI MAC CE, and/or small data. While the 2-step RA procedure is still ongoing (e.g., the 2-step RA procedure has not been successfully completed), the UE may receive a fallback indication from the network and perform at least one of the fallback actions. In some implementations, the UE may determine the received fallback indication as a valid fallback indication if at least one of the following validation criteria is satisfied and may perform at least one of the fallback actions if the fallback indication is determined as valid.

Validation criterion 1: A specific timer is running when the fallback indication is received.

In some implementations, the specific timer may be an msgB-ResponseWindow. Specifically, after the UE transmits the RA preamble, it may start an msgB-ResponseWindow. Subsequently, if a fallback indication is received while the msgB-ResponseWindow is running, the UE may consider the fallback indication as valid.

In some implementations, the specific timer may be an ra-ContentionResolutionTimer. Specifically, after the UE transmits the RA preamble, it may start an msgB-ResponseWindow. Subsequently, if an MSGB that includes a fallback RAR MAC subPDU for the UE is received while the msgB-ResponseWindow is running, the UE may transmit an MSG3 and (re)start ra-ContentionResolutionTimer upon the end of MSG3 transmission. Subsequently, if a fallback indication is received while the ra-ContentionResolutionTimer is running, the UE may consider the fallback indication as valid.

Validation criterion 2: The received fallback indication is for the UE.

In some implementations, the UE may determine that the received fallback indication is for the UE if the fallback indication is included in an MSGB MAC PDU that is received by the UE as part of the 2-step RA procedure. Here, the fallback indication may be included in a "MAC subPDU for fallback RAR", a "MAC subPDU for success RAR", and/or a "MAC subPDU for SDU" in the MSGB MAC PDU.

In some implementations, the fallback indication may be included in a "MAC subPDU for fallback RAR". The UE may determine that the fallback indication is for the UE if the RAPID value in the MAC subheader of the "MAC subPDU for fallback RAR" corresponds to the preamble index (e.g., PREAMBLE_INDEX) transmitted by the UE as part of MSGA.

In some implementations, the UE may transmit a CCCH SDU in the MSGA payload. Moreover, the content of CCCH SDU may be referred to as the RRCResumeRequest message. In some such implementations, the fallback indication may be included in a "MAC subPDU for success RAR". The UE may determine that the fallback indication is for the UE if the UE contention resolution identity in the "MAC subPDU for success RAR" matches the (value of the) CCCH SDU transmitted by the UE in the MSGA payload.

In some implementations, the UE may transmit a CCCH SDU in the MSGA payload. Moreover, the content of CCCH SDU may be referred to as the RRCResumeRequest message. In some such implementations, the fallback indication may be included in a "MAC subPDU for MAC SDU", and the presence the "MAC subPDU for MAC SDU" may be indicated by a "MAC subPDU for success RAR". In some such implementations, the UE may determine that the fallback indication is for the UE if the UE contention resolution identity in the "MAC subPDU for success RAR" matches the (value of the) CCCH SDU transmitted by the UE in the MSGA payload.

In some implementations, the UE may determine that the received fallback indication is for the UE if the fallback indication is included in MSG4, and for which MSG4 is received by the UE as part of the 2-step RA procedure. For instance, the UE may attempt to receive MSG4 after it receives a "MAC subPDU for fallback RAR" and perform an MSG3 transmission. Here, MSG4 may be a MAC PDU that includes a UE Contention Resolution Identity MAC CE.

In some implementations, the UE may determine that the fallback indication is for the UE if the UE contention resolution identity MAC CE matches the (value of the) CCCH SDU transmitted by the UE in the MSG3.

In some implementations, the UE may determine that the received fallback indication is for the UE if the UE transmits CCCH data in MSGA, and the fallback indication is included in DCI associated with the MSGB-RNTI for MSGB as part of the 2-step RA procedure.

In some implementations, the UE may determine that the received fallback indication is for the UE if a field of the DCI includes the identity of the UE.

In some implementations, the UE may determine that the received fallback indication is for the UE if the UE transmits a C-RNTI data in MSGA, and the fallback indication is included in DCI associated with C-RNTI for MSGB as part of the 2-step RA procedure.

In some implementations, the UE may determine that the received fallback indication is for the UE if a field in the DCI includes the identity of the UE.

In some implementations, the UE may determine that the received fallback indication is for the UE if the UE transmits a CCCH SDU in MSG3, and the fallback indication is included in DCI associated with Temporary_C-RNTI for MSG4 as part of the 2-step RA procedure.

In some implementations, the UE may determine that the received fallback indication is for the UE if a field of the DCI includes the identity of the UE.

In some implementations, the UE may determine that the received fallback indication is for the UE if the UE transmits a C-RNTI in MSG3, and the fallback indication is included in DCI associated with C-RNTI for MSG4 as part of the 2-step RA procedure.

In some implementations, the UE may determine that the received fallback indication is for the UE if a field of the DCI includes the identity of the UE.

Scenario 2: Reception of a fallback indication while a 4-step RA procedure, which is initiated as part of an RA-based SDT procedure, is still ongoing.

In some implementations, a UE may initiate a 4-step RA procedure as part of the RA-based SDT procedure. The 4-step RA procedure may include transmission of an RA preamble to the network (e.g., MSG1), reception of an RAR from the network, transmission of an MSG3 to the network, and reception of an MSG4 from the network. In some implementations, the RA preamble may be associated with the SDT (e.g., an RA preamble with an SDT indication). In some implementations, MSG3 may include CCCH data (e.g., RRCResumeRequest message), C-RNTI MAC CE, and/or small data. While the 4-step RA procedure is still ongoing (e.g., the 4-step RA procedure has not been successfully completed), the UE may receive a fallback indication from the network and perform at least one of the fallback actions, as described above and below. In some implementations, the UE may determine the received fallback indication as a valid fallback indication if at least one of the following validation criteria is satisfied. The UE may then perform the fallback action if the fallback indication is determined as valid.

Validation criterion 1: A specific timer is running when the fallback indication is received.

In some implementations, the specific timer may be an ra-ResponseWindow. Specifically, after the UE transmits the RA preamble, it may start an ra-ResponseWindow. Subsequently, if a fallback indication is received while the ra-ResponseWindow is running, the UE may consider the fallback indication as valid.

In some implementations, the specific timer may be an ra-ContentionResolutionTimer. Specifically, after the UE transmits MSG3, it may start an ra-ContentionResolutionTimer. Subsequently, if a fallback indication is received while the ra-ContentionResolutionTimer is running, the UE may consider the fallback indication as valid.

Validation criterion 2: The received fallback indication is for the UE.

In some implementations, the UE may determine that the received fallback indication is for the UE if the fallback indication is included in an RAR MAC PDU that is received by the UE as part of the 4-step RA procedure. Here, the fallback indication may be included in a "MAC subPDU with BI only", a "MAC subPDU with RAPID only", and/or a "MAC subPDU with RAPID and RAR" in the RAR MAC PDU.

In some implementations, the fallback indication may be included in a "MAC subPDU with RAPID only". The UE may determine that the fallback indication is for the UE if the RAPID value in the MAC subheader of the "MAC subPDU with RAPID only" corresponds to the preamble index (e.g., PREAMBLE_INDEX) transmitted by the UE in MSG1.

In some implementations, the fallback indication may be included in a "MAC subPDU with RAPID and RAR". The UE may determine that the fallback indication is for the UE if the RAPID value in the MAC subheader of the "MAC subPDU with RAPID and RAR" corresponds to the preamble index (e.g., PREAMBLE_INDEX) transmitted by the UE in MSG1.

In some implementations, the UE may determine that the received fallback indication is for the UE if the fallback indication is included in an MSG4 that is received by the UE as part of the 4-step RA procedure.

In some implementations, the UE may transmit a CCCH SDU in MSG3. Moreover, the content CCCH SDU may be referred to as the RRCResumeRequest message. In these implementations, the UE may determine that the fallback indication is for the UE if the UE contention resolution identity MAC CE in MSG4 matches the (value of the) CCCH SDU transmitted by the UE in MSG3.

In some implementations, the UE may determine that the received fallback indication is for the UE if the fallback indication is included in DCI associated with RA-RNTI, which is received as part of the 4-step RA procedure.

In some implementations, the UE may determine that the received fallback indication is for the UE if a field of the DCI includes the identity of the UE.

In some implementations, the UE may determine that the received fallback indication is for the UE if the UE transmits a CCCH SDU in MSG3, and the fallback indication is included in DCI associated with Temporary_C-RNTI for MSG4 as part of the 4-step RA procedure.

In some implementations, the UE may determine that the received fallback indication is for the UE if a field of the DCI includes the identity of the UE.

In some implementations, the UE may determine that the received fallback indication is for the UE if the UE transmits a C-RNTI in MSG3, and the fallback indication is included in DCI associated with C-RNTI for MSG4 as part of the 4-step RA procedure.

In some implementations, the UE may determine that the received fallback indication is for the UE if a field of the DCI includes the identity of the UE.

Scenario 3: Reception of a fallback indication after a 2-step/4-step RA procedure, which is initiated as part of an RA-based SDT procedure, has been completed.

In some implementations, after a 2-step/4-step RA procedure that is initiated as part of an RA-based SDT procedure has been completed, the UE may enter a subsequent data transmission phase. During the subsequent data transmission phase, the UE may receive a fallback indication on (e.g., a DL message scheduled by) a specific PDCCH/CORESET/SS and perform at least one of the fallback actions.

In some implementations, the specific PDCCH/CORESET/SS may be used for monitoring dynamic scheduling of UL/DL resources during an RA-based SDT procedure.

In some implementations, the specific PDCCH/CORESET/SS may be configured in RRCRelease message and/or broadcast system information.

In some implementations, the specific PDCCH/CORESET/SS may be configured per RA configuration (for the purpose of SDT).

In some implementations, the UE may only monitor the specific PDCCH/CORESET/SS while a T_response timer is running.

In some implementations, the T_response may be (re)started when the 2-step/4-step RA procedure is completed.

In some implementations, the T_response may be stopped when the RA-based SDT procedure is completed.

In some implementations, the T_response may be configured per RA configuration (e.g., for the purpose of SDT).

More detail with regard to the T_response and specific PDCCH/CORESET/SS will be described below.

In some implementations, a UE may initiate a 2-step/4-step RA procedure as part of an RA-based SDT procedure (e.g., as illustrated in FIG. 3) if at least one of the criteria (which will be described below) is satisfied. In some scenarios (e.g., scenario 4), at least one fallback condition may be satisfied while the 2-step RA procedure is ongoing. In some scenarios (e.g., scenario 5), at least one fallback condition may be satisfied while the 4-step RA procedure is ongoing.

Example scenarios of how a UE satisfies one or more fallback conditions during an ongoing RA-based SDT procedure are described below.

Scenario 4: At least one of the enumerated fallback conditions 1 to 9, as described below, is satisfied while a 2-step RA procedure, which is initiated as part of an RA-based SDT procedure, is still ongoing.

In some implementations, a UE may initiate a 2-step RA procedure as part of the RA-based SDT procedure. The 2-step RA procedure may include an MSGA transmission and an MSGB/RAR (MAC PDU) reception. In some implementations, the MSGA transmission may include transmission of an RA preamble for the purpose of SDT (e.g., an RA preamble with SDT indication) and transmission of an MSGA payload. In some implementations, the MSGA payload may include CCCH data (e.g., RRCResumeRequest message), C-RNTI MAC CE, and/or small data. While the 2-step RA procedure is still ongoing (e.g., the 2-step RA procedure has not been successfully completed), the UE may satisfy at least one of the following fallback conditions 1 to 9 and perform at least one of the fallback actions.

Fallback condition 1: The UE receives a "MAC subPDU for fallback RAR" in the MSGB MAC PDU.

In some implementations, if the UE receives the MSGB MAC PDU that includes a "MAC subPDU for fallback RAR", the UE may perform at least one of the fallback actions. This condition may work under the assumption that the "MAC subPDU for fallback RAR" does not include a fallback indication.

In some implementations, the UE may perform at least one of the fallback actions if the received "MAC subPDU for fallback RAR" is for the UE. The UE may determine that "MAC subPDU for fallback RAR" is for the UE if the RAPID value in the MAC subheader of the "MAC subPDU for fallback RAR" corresponds to the preamble index (e.g., PREAMBLE_INDEX) transmitted by the UE as part of MSGA.

Fallback condition 2. A specific type of UL data becomes available for transmission at the UE.

In some implementations, the specific type of UL data may be from an LCH that is not configured for an SDT.

In some implementations, the specific type of UL data may be from an LCH that is explicitly configured by the network.

In some implementations, the specific type of UL data may include a specific RRC message and/or NAS message.

In some implementations, if the specific type of UL data arrives, the UE may or may not initiate a new RA procedure to transmit a normal RRCResumeRequest message. If the UE decides not to initiate a new RA procedure and stop the ongoing 2-step RA procedure, the UE may transmit the normal RRCResumeRequest message and/or may not transmit small data in the MSGA payload, MSG3, and/or the UL grant indicated by MSGB that is received during the ongoing 2-step RA procedure.

Fallback condition 3: A number of UL transmissions reaches a threshold value.

In some implementations, a number of UL transmissions may be referred to as the number of (first/initial) MSG3 transmissions during a CG-based SDT procedure.

In some implementations, a number of UL transmissions may be referred to as the number of (first/initial) MSGA transmissions or the number of preamble transmissions during the 2-step RA procedure.

In some implementations, a counter may be maintained at the UE. The counter may be used to count the number of UL transmissions. If the counter reaches a specific (or threshold) value, the UE may perform at least one of the fallback actions.

In some implementations, the specific value may be configured by the network via dedicated RRC signaling (e.g., RRCRelease message) and/or broadcast system information (e.g., SIB).

In some implementations, the specific value may be predefined by the UE.

In some implementations, the specific value may be preambleTransMax or msgA-TransMax configured for the UE.

In some implementations, the UL transmissions may include a CCCH SDU (e.g., RRCResumeRequest message) for the SDT.

Fallback condition 4: A TBS of a UL resource indicated in a MSGB (MAC PDU) is not equal to a specific threshold.

In some implementations, the UL resource may be indicated in "MAC subPDU for fallback RAR" in the MSGB MAC PDU.

In some implementations, the specific threshold may be configured in dedicated RRC signaling (e.g., RRCRelease message) and/or broadcast system information (e.g., SIB).

In some implementations, the specific threshold may be the data volume threshold that is used by the UE for selecting the SDT procedure and non-SDT procedure when UL data (e.g., from an LCH configured for SDT) arrives at the UE.

In some implementations, the specific threshold may be used to determine the groups of RA preamble (e.g., RA preamble group A or RA preamble group B) for the 2-step RA procedure. For example, the threshold may be configured for a 2-step RA procedure that is initiated as part of an RA-based SDT procedure. For example, the threshold may be ra-MsgA-SizeGroupA.

In some implementations, the TBS of the UL resource may be bigger or smaller than the specific threshold.

In some implementations, a UE may initiate a 2-step RA procedure as part of an RA-based SDT procedure. If the total UL data available for transmission (e.g., data from CCCH (including RRCResumeRequest message), data from LCHs configured for SDT, MAC Ces to be generated, etc.) is greater than a specific threshold (e.g., ra-MsgA-SizeGroupA for a 2-step RA procedure that is initiated as part of an RA-based SDT procedure), an MSGA RA preamble that corresponds to a 2-step RA group B (for the SDT) may be transmitted during the 2-step RA procedure. Subsequently, the UE may receive an MSGB that indicates a UL resource (e.g., the UL resource is indicated in the "fallback RAR MAC subPDU" of the MSGB). The UE may perform at least one of the fallback actions if the TBS of the indicated UL resource is smaller than the specific threshold.

Fallback condition 5: A TBS of a UL resource indicated in MSGB/RAR (MAC PDU) may not be mapped to the pending UL data and or MAC CE at the UE.

In some implementations, the pending UL data may be referred to as the UL data that is available for transmission.

In some implementations, the pending UL data may be from an LCH configured for an SDT.

In some implementations, the pending UL data may be from a CCCH (including RRCResumeRequest message).

In some implementations, the MAC CE may be a BSR MAC CE.

Fallback condition 6: The RA procedure is considered unsuccessfully completed.

In some implementations, the RA procedure may be considered unsuccessfully completed if the number of preamble transmissions during the RA procedure exceeds a threshold configured for the UE (e.g., preambleTransMax).

In some implementations, the MAC entity of the UE may indicate an RA problem (e.g., send an RA problem indication) to the RRC layer of the UE if the RA procedure is unsuccessfully completed.

Fallback condition 7: A DL RSRP is below an RSRP threshold.

In some implementations, the DL RSRP may be a cell-level RSRP or SS-RSRP (e.g., measured from an SSB that corresponds to a CG PUSCH). The DL-RSRP may include the best quality DL-RSRP out of all the DL-RSRPs that the UE measures.

In some implementations, the DL RSRP may be the average RSRP per SSB set (e.g., for a CG configuration). An SSB set may include one or multiple SSBs.

In some implementations, the UE may perform a DL measurement from an SSB in order to obtain the DL RSRP. Here, the DL measurement may be performed by the UE when at least one of the fallback conditions 1 to 6 is satisfied.

In some implementations, the RSRP threshold may be used to by the UE for the selection between (e.g., CG-based/RA-based) SDT procedure and non-SDT procedure (e.g., normal RRC connection resume procedure/normal RA procedure).

In some implementations, if the measured DL RSRP threshold is below the RSRP threshold, the UE may perform at least one of the fallback actions.

Fallback condition 8: a specific timer/window expires.

In some implementations, the specific timer/window may be configured specifically for performing a fallback.

In some implementations, the specific timer/window may be (re)started after initial transmission of CG PUSCH/MSG3/MSGA. In some implementations, MSG3/MSGA is transmitted with an RRC resume request message/RRC resume request 1 message when a resume procedure is initiated for an SDT.

In some implementations, the specific timer/window may be stopped upon receiving a response from the network.

In some implementations, the response may be a dynamic scheduling (e.g., DCI associated with C-RNTI/CS-RNTI/Temporary_C-RNTI) of a DL/UL resource for new transmission/retransmission of UL small data.

In some implementations, the response may be an RRC message from the network, e.g., RRCResume message, RRCReestablishment message, RRCRelease message, etc.

In some implementations, the specific timer/window may be an SDT failure detection timer, an ra-ResponseWindow, an ra-ContentionResolutionTimer, an msgB-ResponseWindow, a T_response (configured for the UE to monitor PDCCH during a subsequent data transmission phase of an RA-based SDT procedure or a CG-based SDT procedure), a configuredGrantTimer, a cg-RetransmissionTimer, etc.

In some implementations, the specific timer is the SDT failure detection timer, which may be (re)started after initial transmission of CG PUSCH/MSG3/MSGA and stopped upon receiving a response from the network. In some implementations, the response may be an RRC message from the network, e.g., RRCResume message, RRCReestablishment message, RRCRelease message, etc.

In some implementations, the UE may perform at least one of the fallback actions when the specific timer/window expires.

Fallback condition 9: The number of RLC retransmissions reaches a configured threshold.

In some implementations, the UE may perform at least one of the fallback actions when the number of retransmissions of an RLC SDU reaches a configured threshold (e.g., maxRetxThreshold)

Scenario 5: At least one of the enumerated fallback condition 10 to 17, as described below, is satisfied while a 4-step RA procedure, which is initiated as part of an RA-based SDT procedure, is still ongoing.

In some implementations, a UE may initiate a 4-step RA procedure as part of the RA-based SDT procedure. The 4-step RA procedure may include a transmission of an RA preamble to the network (e.g., MSG1), a reception of an RAR from the network, a transmission of an MSG3 to the network, and a reception of an MSG4 from the network. In some implementations, the RA preamble may be for the SDT (e.g., an RA preamble with SDT indication). In some implementations, MSG3 may include CCCH data (e.g., RRCResumeRequest message), C-RNTI MAC CE, and/or small data. While the 4-step RA procedure is still ongoing (e.g., the 4-step RA procedure has not been successfully completed), the UE may satisfy at least one of the following fallback conditions 10 to 17 and perform at least one of the fallback actions.

Fallback condition 10: A specific type of UL data becomes available for transmission at the UE.

In some implementations, the specific type of UL data may be from an LCH that is not configured for SDT.

In some implementations, the specific type of UL data may be from an LCH that is explicitly configured by the network.

In some implementations, the specific type of UL data may include a specific RRC message and/or NAS message.

In some implementations, if the specific type of UL data arrives at the UE, the UE may or may not initiate a new RA procedure to transmit a normal RRCResumeRequest message. If the UE decides not to initiate a new RA procedure and stop the ongoing 4-step RA procedure, the UE may transmit the normal RRCResumeRequest message and/or may not transmit small data in the MSG3 and/or UL grant indicated by MSG4 that is received during the ongoing 4-step RA procedure.

Fallback condition 11: A number of UL transmissions reaches a specific (or threshold) value.

In some implementations, a number of UL transmissions may be referred to as the number of preamble transmissions.

In some implementations, a counter may be maintained at the UE. The counter may be used to count the number of UL transmissions. If the counter reaches a specific value, the UE may perform at least one of the fallback actions.

In some implementations, the specific value may be configured by the network via dedicated RRC signaling (e.g., RRCRelease message) and/or broadcast system information (e.g., SIB).

In some implementations, the specific value may be predefined by the UE.

In some implementations, the specific value may be preambleTransMax configured for the UE.

In some implementations, the UL transmissions may include a CCCH SDU (e.g., RRCResumeRequest message) for the purpose of SDT.

Fallback condition 12: A TBS of a UL resource indicated in an RAR (MAC PDU) is not equal to a specific threshold.

In some implementations, the UL resource may be indicated in "MAC subPDU with RAPID and RAR" in the RAR MAC PDU.

In some implementations, the specific threshold may be configured by dedicated RRC signaling (e.g., RRCRelease message) and/or broadcast system information (e.g., SIB).

In some implementations, the specific threshold may be the data volume threshold that is used by the UE for selecting an SDT procedure and non-SDT procedure when a UL data (from an LCH configured for SDT) arrives at the UE.

In some implementations, the specific threshold may be used to determine the groups of RA preamble (e.g., RA preamble group A or RA preamble group B) for the 4-step RA procedure. For example, the threshold may be configured for a 4-step RA procedure that is initiated as part of an RA-based SDT procedure. For example, the threshold may be ra-Msg3SizeGroupA.

In some implementations, the TBS of the UL resource may be bigger or smaller than the specific threshold.

In some implementations, a UE may initiate a 4-step RA procedure as part of an RA-based SDT procedure. If the total UL data available for transmission (e.g., data from CCCH (including RRCResumeRequest message), data from LCHs configured for SDT, MAC CEs to be generated, etc.) is greater than a specific threshold (e.g., ra-Msg3SizeGroupA for a 4-step RA procedure that is initiated as part of an RA-based SDT procedure), an RA preamble (e.g., MSG1) that corresponds to 4-step RA group B (for the purpose of SDT) may be transmitted during the 4-step RA procedure. Subsequently, the UE may receive an RAR (e.g., MSG2) that indicates a UL resource (e.g., the UL resource is indicated in the "MAC subPDU with RAPID and RAR" of the RAR MAC PDU). The UE may perform at least one of the fallback actions if the TBS of the indicated UL resource is smaller than the specific threshold.

Fallback condition 13: A TBS of a UL resource indicated in MSGB/RAR (MAC PDU) may not be mapped to the pending UL data and or MAC CE at the UE.

In some implementations, the pending UL data may be referred to as the UL data that is available for transmission.

In some implementations, the pending UL data may be from an LCH configured for an SDT.

In some implementations, the pending UL data may be from a CCCH (e.g., including RRCResumeRequest message).

In some implementations, the MAC CE may be a BSR MAC CE.

Fallback condition 14: The RA procedure is considered unsuccessfully completed.

In some implementations, the RA procedure may be considered unsuccessfully completed if the number of preamble transmissions during the RA procedure exceeds a threshold configured for the UE, e.g., preambleTransMax.

In some implementations, the MAC entity of the UE may indicate an RA problem (e.g., send an RA problem indication) to the RRC layer of the UE if the RA procedure is unsuccessfully completed.

Fallback condition 15: A DL RSRP is below an RSRP threshold

In some implementations, the DL RSRP may be a cell-level RSRP or SS-RSRP (measured from an SSB that corresponds to a CG PUSCH). The DL-RSRP may be the best quality DL-RSRP out of all the DL-RSRPs that the UE measures.

In some implementations, the DL RSRP may be the average RSRP per SSB set (e.g., for a CG configuration). An SSB set may include one or multiple SSBs.

In some implementations, the UE may perform DL measurement from an SSB in order to obtain the DL RSRP. Here, the DL measurement may be performed by the UE when at least one of fallback condition 10 to 14 is satisfied.

In some implementations, the RSRP threshold may be used by the UE for the selection between (CG-based/RA-based) SDT procedure and non-SDT procedure (e.g., normal RRC connection resume procedure/normal RA procedure).

In some implementations, if the measured DL RSRP threshold is below the RSRP threshold, the UE may perform at least one of the fallback actions.

Fallback condition 16: a specific timer/window expires.

In some implementations, the specific timer/window may be configured specifically for performing fallback.

In some implementations, the specific timer/window may be (re)started after initial transmission of CG PUSCH/MSG3/MSGA. In some implementations, the MSG3/MSGA is transmitted with an RRC resume request message/RRC resume request 1 message when a resume procedure is initiated for an SDT.

In some implementations, the specific timer/window may be stopped upon receiving a response from the network.

In some implementations, the response may be a dynamic scheduling (e.g., DCI associated with C-RNTI/CS-RNTI/Temporary_C-RNTI) of a DL/UL resource for new transmission/retransmission of UL small data.

In some implementations, the response may be an RRC message from the network, e.g., RRCResume message, RRCReestablishment message, RRCRelease message, etc.

In some implementations, the specific timer/window may be an SDT failure detection timer, an ra-ResponseWindow, an ra-ContentionResolutionTimer, an msgB-ResponseWindow, a T_response (configured for the UE to monitor PDCCH during a subsequent data transmission phase of an RA-based SDT procedure or a CG-based SDT procedure), a configuredGrantTimer, a cg-RetransmissionTimer, etc.

In some implementations, the specific timer is the SDT failure detection timer, which may be (re)started after initial transmission of CG PUSCH/MSG3/MSGA and stopped upon receiving a response from the network. In some implementations, the response may be an RRC message from the network, e.g., RRCResume message, RRCReestablishment message, RRCRelease message, etc.

In some implementations, the UE may perform at least one of the fallback actions when the specific timer/window expires.

Fallback condition 17: The number of RLC retransmissions reaches a configured threshold.

In some implementations, the UE may perform at least one of the fallback actions when the number of retransmissions of a RLC SDU reaches a configured threshold (e.g., maxRetxThreshold).

In some implementations, after a UE performs a first transmission on a CG PUSCH as part of a CG-based SDT procedure, the UE may enter a subsequent data transmission phase. During the subsequent data transmission phase, the UE may receive a fallback indication on (e.g., a DL message scheduled by) a specific PDCCH/CORESET/SS and perform at least one of the fallback actions.

In some implementations, the specific PDCCH/CORESET/SS may be used for monitoring dynamic scheduling of UL/DL resource during a CG-based SDT procedure.

In some implementations, PDCCH-CG-SDT may be configured in RRCRelease message and/or broadcast system information.

In some implementations, the specific PDCCH/CORSET/SS may be configured in a CG configuration (for the purpose of SDT).

In some implementations, the UE may only monitor on the specific PDCCH/CORESET/SS while T_response is running.

In some implementations, T_response may be (re)started upon the UE perform (first/initial) transmission on a CG PUSCH as part of a CG-based SDT procedure.

In some implementations, T_response may be stopped when the CG-based SDT procedure is completed.

In some implementations, T_response may be configured per CG configuration.

More detail with regard to the specific PDCCH/CORESET/SS and T_response will be described below.

In some implementations, after a UE performs a first transmission on a CG PUSCH as part of a CG-based SDT procedure, the UE may enter a subsequent data transmission phase. During the subsequent data transmission phase, the UE may satisfy one or more fallback conditions and perform at least one of the fallback actions. The one or more fallback conditions here may be the same as the fallback conditions as mentioned above (e.g., the fallback conditions 1 to 17 for RA-based SDT procedure).

In some implementations, the network may send a fallback indication to a UE on a PDCCH.

In some implementations, the fallback indication may be a PDCCH order and/or DFI. The UE may perform at least one of the fallback actions if it receives the PDCCH order and/or DFI.

In some implementations, the fallback indication may be included in a field of DCI.

In some implementations, the network may include a first value in the DCI field to indicate the presence of the fallback indication. Hence, the UE may perform at least one of the fallback actions only if it receives the DCI having the DCI field with the first value.

In some implementations, the DCI field may be 1-bit.

In some implementations, the fallback indication may be included in at least one of the existing DCI fields from a DCI format 0_0, 0_1, 0_2, 10, and/or 1_1. The network may set at least one of the existing DCI fields to a specific value(s) for indicating a fallback indication. Hence, the UE may perform at least one of the fallback actions only if it receives the DCI having at least one of the existing DCI fields with the specific value(s).

The fallback indication may be included in at least one of a HARQ process number field, a MCS field, an NDI field, an RV field, etc.

In some implementations, the fallback indication may be included in DCI with a specific DCI format.

In some implementations, the DCI may have a DCI format of 0_0, 0_1, 0_2, 10, 1_1, and/or 1_2.

In some implementations, the fallback indication may be included in DCI associated with a specific RNTI.

In some implementations, the DCI may be associated with a C-RNTI, a CS-RNTI, and/or another UE-specific RNTI.

In some implementations, the DCI may be associated with an RA-RNTI, an MSGB-RNTI, a Temporary_C-RNTI, and/or another group-common RNTI.

In some implementations, some inter-layer interactions may be performed by the UE upon receiving the fallback indication. For example, upon reception of the fallback indication, the PHY layer of the UE may indicate to the upper layer (e.g., MAC layer and/or RRC layer) of the UE to perform at least one of the fallback actions.

In some implementations, the network may transmit a fallback indication to a UE via a DL MAC CE.

In some implementations, the DL MAC CE may correspond to a specific LCID value. It should be noted that the LCID value may be included in a MAC subheader. Moreover, the MAC subheader may be part of a MAC subPDU that carries the DL MAC CE.

In some implementations, the DL MAC CE may or may not include a payload.

In some implementations, the fallback indication may be included in the payload of the DL MAC CE.

In some implementations, some inter-layer interactions may be performed by the UE upon receiving the fallback indication. For example, upon reception of the fallback indication, the MAC layer of the UE may indicate to the upper layer (e.g., RRC layer) to perform at least one of the fallback actions. For example, upon reception of the fallback indication, the MAC layer of the UE may perform at least one of the fallback actions.

In some implementations, the network may send a fallback indication to a UE via an RRC message.

In some implementations, the fallback indication may be referred to as dedicated RRC signaling. The dedicated RRC signaling may be an RRCRelease message, an RRCResume message, an RRCReestablishment message, etc.

In some implementations, the fallback indication may be a broadcast system information (e.g., SIB).

In some implementations, the fallback indication may be included in a specific type of broadcast system information (e.g., SIBx). All the UEs in the RRC_INACTIVE state performing a CG-based and/or RA-based SDT procedure may perform at least one of the fallback actions upon reception of the fallback indication.

In some implementations, upon reception of the fallback indication, the RRC layer of the UE may indicate to the lower layer (e.g., MAC layer) to perform at least one of the fallback actions.

In some implementations, some inter-layer interactions may be performed by the UE upon receiving the fallback indication. For example, upon reception of the fallback indication, the RRC layer of the UE may perform at least one of the fallback actions.

In some implementations, the network may send a fallback indication to a UE via an RAR (MAC PDU). The UE may receive the RAR (MAC PDU) during a (4-step) RA procedure that is initiated as part of an RA-based SDT procedure.

In some implementations, the fallback indication may be indicated in a "MAC subPDU with BI only" in the RAR MAC PDU.

In some implementations, the fallback indication may be indicated in one or more fields in the subheader of "MAC subPDU with BI only". The subheader may have a format as shown in Table 1 below. The network may include a specific value in the one or more fields to represent the fallback indication. Hence, the UE may perform at least one of the fallback actions only if it receives the specific value from the one or multiple fields. As shown in Table 1, each field may be one or more bits. The fields may be referred to as the E bit, T bit, R bit, and BI bit of the subheader.

TABLE 1

| E (1 bit) | T (1 bit) | R (1 bit) | R (1 bit) | BI (4 bits) |
| --- | --- | --- | --- | --- |

In some implementations, the fallback indication may be included in a "MAC subPDU with RAPID and RAR" in the RAR MAC PDU.

In some implementations, the fallback indication may be indicated in one or more fields in the subheader of "MAC subPDU with RAPID and RAR". The subheader may have a format as shown in Table 2 below. The network may include a specific value in the one or more fields to represent the fallback indication. Hence, the UE may perform at least one of the fallback actions only if it receives the specific value from the one or more fields. As shown in Table 2, each field may be one or more bits. The field may be referred to as the E bit, T bit, and RAPID bit of the subheader.

TABLE 2

| E (1 bit) | T (1 bit) | RAPID (6 bits) |
| --- | --- | --- |

In some implementations, the fallback indication may be indicated in one or more fields in the MAC RAR payload of the "MAC subPDU with RAPID and RAR". The network may include a specific value in the one or more fields to represent the fallback indication. Hence, the UE may perform at least one of the fallback actions only if it receives the specific value. Each field may be one or more bits. The field may be referred to as the R bit in the MAC RAR payload.

In some implementations, the fallback indication may be (included in) a specific MAC subPDU in the RAR MAC PDU. The UE may perform at least one of the fallback actions if it receives the specific MAC subPDU in the RAR MAC PDU.

In some implementations, the specific MAC subPDU may have a specific subheader. For example, the specific subheader may be 1 byte. For example, the specific subheader of the specific MAC subPDU may have a same or different subheader format from a "MAC subPDU with BI only", "MAC subPDU with RAPID and RAR", and "MAC subPDU with RAPID only".

In some implementations, the fallback indication may be indicated in one or more fields of the specific subheader. The network may include a specific value in the one or more fields to represent the fallback indication. Hence, the UE may perform at least one of the fallback actions only if it receives the specific value. Each field may be one or more bits. The field may be referred to as the E bit, T bit, RAPID bit, and R bit in the specific subheader.

In some implementations, the specific MAC subPDU may or may not include a MAC RAR payload.

In some implementations, if the specific MAC subPDU includes a MAC RAR payload, the MAC RAR payload may have a same or different payload format from the MAC RAR payload of the "MAC subPDU with RAPID and RAR".

In some implementations, if the specific MAC subPDU includes a MAC RAR payload, the fallback indication may be indicated in one or more fields of the MAC RAR payload. The network may include a specific value in the one or more fields to represent the fallback indication. Hence, the UE may perform at least one of the fallback actions only if it receives the specific value. Each field may be one or more bits. The field may be referred to as the R bit in the MAC RAR payload.

In some implementations, a fallback indication may be included in a MSGB (MAC PDU). The UE may receive MSGB (MAC PDU) during a (2-step) RA procedure that is initiated as part of an RA-based SDT procedure.

In some implementations, the fallback indication may be included in a "MAC subPDU with BI only" in the MSGB MAC PDU.

In some implementations, the fallback indication may be indicated in one or more fields in the subheader of "MAC subPDU with BI only". The subheader may have a format as shown in Table 3 below. The network may include a specific value in the one or more fields to represent the fallback indication. Hence, the UE may perform at least one of the fallback actions only if it receives the specific value from the one or more fields. Each field may be one or more bits. The field may be referred to as the E bit, T1 bit, T2 bit, R bit, and BI bit of the subheader.

TABLE 3

| E (1 bit) | T1 (1 bit) | T2 (1 bit) | R (1 bit) | BI (4 bits) |
| --- | --- | --- | --- | --- |

In some implementations, the fallback indication may be included in a "MAC subPDU for fallback RAR" in the MSGB MAC PDU.

In some implementations, the fallback indication may be indicated in one or more fields in the subheader of "MAC subPDU for fallback RAR". The subheader may have a format as shown in Table 4 below. The network may include a specific value in the one or more fields to represent the fallback indication. Hence, the UE may perform at least one of the fallback actions only if it receives the specific value from the one or multiple fields. Each field may be one or more bits. The field may be referred to as the E bit, T1 bit, and RAPID bit of the subheader.

TABLE 4

| E (1 bit) | T1(1 bit) | RAPID (6 bits) |
| --- | --- | --- |

In some implementations, the fallback indication may be indicated in one or more fields in the MAC RAR payload of the "MAC subPDU for fallback RAR". The network may include a specific value in the one or more fields to represent the fallback indication. Hence, the UE may perform at least one of the fallback actions only if it receives the specific value. Each field may be one or more bits. The field may be referred to as the R bit in the MAC RAR payload.

In some implementations, the fallback indication may be included in a "MAC subPDU for success RAR" in the MSGB MAC PDU.

In some implementations, the fallback indication may be indicated in one or more fields in the subheader of "MAC subPDU for success RAR". The subheader may have a format as shown in Table 5 below. The network may include a specific value in the one or more fields to represent the fallback indication. Hence, the UE may perform at least one of the fallback actions only if it receives the specific value from the one or more fields. Each field may be one or more bits. The field may be referred to as the E bit, T1 bit, T2 bit, S bit, and R bit of the subheader.

TABLE 5

| E (1 bit) | T1 (1 bit) | T2 (1 bit) | S (1 bit) | R (1 bit) | R (1 bit) | R (1 bit) | R (1 bit) |
|---|---|---|---|---|---|---|---|

In some implementations, the fallback indication may be indicated in one or more fields in the successRAR payload of the "MAC subPDU for success RAR". The network may include a specific value in the one or more fields to represent the fallback indication. Hence, the UE may perform at least one of the fallback actions only if it receives the specific value. Each field may be one or more bits. The field may be referred to as the R bit in the success RAR payload.

In some implementations, the fallback indication may be included in a "MAC subPDU for SDU" in the MSGB MAC PDU.

In some implementations, the fallback indication may be indicated in one or more fields in the subheader of "MAC subPDU for SDU". The subheader may have a format as shown in Table 6 below. The network may include a specific value in the one or more fields to represent the fallback indication. Hence, the UE may perform at least one of the fallback actions only if it receives the specific value from the one or more fields. Each field may be one or more bits. The field ma be referred to as the R bit F bit LCD bit and L bit of the subheader.

TABLE 6

| R (1 bit) | F (1 bit)<br>L (8 bits) | RAPID (6 bits) |
|---|---|---|

In some implementations, a DL MAC CE with a specific LCID (as described above) to indicate the presence of fallback indication may be included in the "MAC subPDU for SDU".

In some implementations, the fallback indication may be (included in) a specific MAC subPDU in the MSGB MAC PDU.

In some implementations, the UE may perform at least one of the fallback actions if it receives the specific MAC subPDU in the MSGB PDU.

In some implementations, the specific MAC subPDU may have a specific subheader. For example, the specific subheader may be 1 byte. For example, the specific subheader of the specific MAC subPDU may have a same or different subheader format from a "MAC subPDU with BI only", "MAC subPDU for fallback RAR", "MAC subPDU for success RAR", and "MAC subPDU for SDU".

In some implementations, the fallback indication may be indicated in one or more fields of the specific subheader. The network may include a specific value in the one or more fields to represent the fallback indication. Hence, the UE may perform at least one of the fallback actions only if it receives the specific value. Each field may be one or more bits. The field may be referred to as the E bit, T1 bit, T2 bit, R bit, BI bit, RAPID bit, S bit, F bit, LCID bit, and/or L bit in the specific subheader.

In some implementations, the specific MAC subPDU may or may not include a MAC RAR payload.

In some implementations, if the specific MAC subPDU includes a MAC RAR payload, the MAC RAR payload may have a same or different payload format from the MAC RAR payload of the "MAC subPDU for success RAR" and "MAC subPDU for fallback RAR".

In some implementations, if the specific MAC subPDU includes a MAC RAR payload, the fallback indication may be indicated in one or multiple fields of the MAC RAR payload. The network may include a specific value in the one or more fields to represent the fallback indication. Hence, the UE may perform at least one of the fallback actions only if it receives the specific value. Each field may be one or more bits. The field may be referred to as the R bit in the MAC RAR payload.

In some implementations, a fallback indication may be included in an MSG4. The UE may receive MSG4 (MAC PDU) during a (2-step/4-step) RA procedure that is initiated as part of an RA-based SDT procedure.

In some implementations, a DL MAC CE with a specific LCID (e.g., as described above) to indicate the presence of fallback indication may be included in the "MAC subPDU for SDU".

In some implementations, the network may indicate a specific type of fallback indication that may be performed by the UE. The UE may perform different types of fallback action based on the received specific type of fallback indication.

In some implementations, the network may send the specific type of fallback indication on a PDCCH, a DL MAC CE, an RRC message, an RAR (MAC PDU), an MSGB (MAC PDU), and/or an MSG4. Moreover, the implementations mentioned above may be reused by the UE to identify the specific type of fallback indication.

In some implementations, the network may indicate more than one type of fallback indication in the same DCI, DL MAC CE, RRC message, RAR (MAC PDU), MSGB (MAC PDU), and/or MSG4. For example, the network may indicate more than one type of fallback indication by setting different values at one or more bits in one or more fields of the same DCI, DL MAC CE, RRC message, RAR (MAC PDU), MSGB (MAC PDU), and/or MSG4.

In some implementations, the specific type of fallback indication may indicate a fallback from an RA-based SDT procedure to a non-SDT procedure. If a UE receives the specific type of fallback indication while it is performing an RA-based SDT procedure, the UE may stop/terminate the ongoing RA-based SDT procedure and may initiate a non-SDT procedure. Here, the UE may also perform at least one of the fallback actions upon receiving the specific type of fallback indication.

In some implementations, the specific type of fallback indication may indicate a fallback from a CG-based SDT procedure to an RA-based SDT procedure. If a UE receives the specific type of fallback indication while it is performing a CG-based SDT procedure, the UE may stop/terminate the ongoing CG-based SDT procedure and may initiate an RA-based SDT procedure. Here, the UE may also perform at least one of the fallback actions upon receiving the specific type of fallback indication.

In some implementations, the specific type of fallback indication may indicate a fallback from a CG-based SDT procedure to a non-SDT procedure. If a UE receives the specific type of fallback indication while it is performing a CG-based SDT procedure, the UE may stop/terminate the ongoing CG-based SDT procedure and may initiate a non-SDT procedure. Here, the UE may also perform at least one of the fallback actions upon receiving the specific type of fallback indication.

In some implementation, the following fallback actions 1 to 14 may be performed by a UE if a fallback indication is received and/or at least one of the fallback conditions (e.g., as described above) is satisfied.

In some implementations, the following fallback actions 1 to 14 may be performed by the UE after the UE transmits UL feedback (e.g., ACK/NACK) in response to the received fallback indication.

In some implementations, the following fallback actions may be performed by the UE only if the fallback indication is considered valid.

Fallback Action 1: Stop a specific timer(s).

In some implementations, the specific timer (value) may be configured by the network via dedicated RRC signaling (e.g., RRCRelease message) and/or broadcast system information (e.g., SIB).

In some implementations, the specific timer (value) may be applied by the UE in the RRC_INACTIVE state.

In some implementations, the specific timer may be a running timealignmenttimer (that is valid in the RRC_INACTIVE state), a running T_response, a running SDT failure detection timer, a running phr-PeriodicTimer, a running phr-ProhibitTimer, and/or a running bwp-InactivityTimer.

In some implementations, the running T_response may be stopped if the fallback indication is received while a CG-based SDT procedure is ongoing. Here, the T_response may be (re)started upon a first transmission on a CG resource during a CG-based SDT procedure.

In some implementations, the running T_response may be stopped if the fallback indication is received while an RA-based SDT procedure is ongoing. Here, the T_response may be (re)started when an RA procedure initiated as part of the RA-based SDT procedure is completed.

In some implementations, the specific timer may be a running configuredGrantTimer or a cg-RetransmissionTimer.

In some implementations, the running configuredGrantTimer or the cg-RetransmissionTimer may be stopped if the fallback indication is received while a CG-based SDT procedure is ongoing.

In some implementations, the specific timer may be a running msgB-ResponseWindow, a running ra-ResponseWindow, and/or a running ra-ContentionResolutionTimer if the fallback indication is received while a 2-step/4-step RA procedure as part of an RA-based SDT procedure is ongoing.

In some implementations, the running msgB-ResponseWindow, ra-ResponseWindow and/or ra-ContentionResolutionTimer may be stopped if the fallback indication is received while the 2-step/4-step RA procedure as part of the RA-based SDT procedure is ongoing.

Fallback Action 2: Start a specific timer(s).

In some implementations, the specific timer may be a T319 timer.

Fallback Action 3: Release/suspend/clear/discard a specific configuration(s).

In some implementations, the specific configuration may be configured by the network via dedicated RRC signaling (e.g., RRCRelease message) and/or broadcast system information (e.g., SIB). In some implementations, the specific configuration may be used while a UE is in the RRC_INACTIVE state.

In some implementations, the specific configuration may be a CG-based SDT configuration.

In some implementations, the CG-based SDT configuration may be a CG configuration (e.g., ConfiguredGrantConfig) for transmitting small data in the RRC_INACTIVE state.

In some implementations, the CG-based SDT configuration may be used to indicate the time-domain/frequency-domain location of the CG PUSCHs that corresponds to the CG-SDT configuration.

In some implementations, the CG-based SDT configuration may be used to indicate the periodicity that the CG PUSCHs of the CG-based SDT configuration occur.

In some implementations, the CG-based SDT configuration may be released/suspended/cleared/discarded if the fallback indication is received while the CG-based SDT procedure is ongoing. In contrast, the CG configuration may not be released/suspended/cleared/discarded if the fallback indication is received while an RA-based SDT procedure is ongoing.

In some implementations, the specific configuration may be an RA-based SDT configuration.

In some implementations, the RA-based SDT configuration may be a PRACH resource for the purpose of SDT in the RRC_INACTIVE state.

In some implementations, the RA-based SDT configuration may be a PUSCH resource for MSGA payload transmission for the purpose of SDT in the RRC_INACTIVE state.

In some implementations, the RA-based SDT configuration may be released/cleared if the fallback indication is received while an RA-based SDT procedure is ongoing. In contrast, in some implementations, the RA-SDT configuration may not be released/cleared if the fallback indication is received while a CG-based SDT procedure is ongoing.

In some implementations, the specific configuration may be a BWP configuration.

In some implementations, the BWP configuration may be a dedicated (UL/DL) BWP configuration that is valid while a UE is in the RRC_INACTIVE state.

In some implementations, the specific configuration may be a beam measurement configuration.

In some implementations, the beam measurement configuration may configure one or multiple SSBs that are configured for the UE to measure the DL reference signal strength in the RRC_INACTIVE state. The DL reference signal strength may be used by the UE, which may have incoming UL data for transmission, to determine whether to initiate an SDT procedure or a non-SDT procedure. For example, if the measured DL reference signal strength is above a specific threshold, the UE may determine to perform an SDT procedure. Otherwise, the UE may determine to perform a non-SDT procedure.

In some implementations, the beam measurement configuration may configure one or multiple SSBs that correspond/map to a CG configuration/resource. The one or multiple SSBs may be used for determining whether the CG configuration/resource that it maps/corresponds to is suitable for performing UL transmission. For example, if the measured DL RSRP from the one or multiple SSBs is below a configured threshold, the UE may not use the CG configuration/resource that it maps/corresponds to for performing UL transmission. For example, if the measured DL RSRP from the one or multiple SSBs is below a configured threshold, the UE may clear/suspend the CG configuration/resource that it maps/corresponds to.

The configuration of one or multiple SSBs that correspond to a CG configuration/resource may be released/suspended/cleared if the fallback indication is received while the CG-based SDT procedure is ongoing. In contrast, the configuration of one or multiple SSBs that correspond to a CG configuration/resource may not be released/suspended/cleared if the fallback indication is received while the RA-based SDT procedure is ongoing.

In some implementations, the specific configuration may be a PDCCH/CORESET/SS configuration.

In some implementations, the PDCCH/CORESET/SS configuration may be used for monitoring the network response (e.g., a dynamic UL grant/DL assignment that schedules a UL/DL resource for the UE to perform) while the UE is in the subsequent data transmission phase.

In some implementations, the PDCCH/CORESET/SS configuration may be used for monitoring the network response during an RA procedure within an RA-based SDT procedure. For example, the PDCCH/CORESET/SS configuration may be used for monitoring for the scheduling of RAR/MSG4/MSGB/contention resolution.

Fallback Action 4: Stop monitoring on a specific DL resource(s).

In some implementations, the specific DL resource may be one or multiple SSBs that correspond/map to a CG configuration/resource. The UE may stop monitoring the one or multiple SSBs that correspond/map to a CG configuration/resource if the fallback indication is received while the CG-based SDT procedure is ongoing.

In some implementations, the specific DL resource may correspond to a PDCCH/CORESET/SS configuration.

In some implementations, the PDCCH/CORESET/SS configuration may be used for monitoring the network response (e.g., a dynamic UL grant/DL assignment that schedules a UL/DL resource for the UE to perform) while the UE is in the subsequent data transmission phase. The UE may stop monitoring the PDCCH/CORESET/SS for the network response (e.g., a dynamic UL grant/DL assignment that schedules a UL/DL resource for the UE to perform) if the fallback indication is received in the subsequent data transmission phase of an ongoing CG-/RA-based SDT procedure.

In some implementations, the PDCCH/CORESET/SS configuration may be used for monitoring the network response during an RA procedure within an RA-based SDT procedure. For example, the PDCCH/CORESET/SS configuration may be used for monitoring for the scheduling of RAR/MSG4/MSGB/contention resolution.

In some implementations, the UE may stop monitoring the PDCCH/CORESET/SS for scheduling of RAR if the fallback indication is received while the RA-based SDT procedure is ongoing and an ra-ResponseWindow is running.

In some implementations, the UE may stop monitoring the PDCCH/CORESET/SS for scheduling of MSG4/contention resolution if the fallback indication is received while the RA-based SDT procedure is ongoing and a ContentionResolutionTimer is running.

In some implementations, the UE may stop monitoring the PDCCH/CORESET/SS for scheduling of MSGB if the fallback indication is received while the RA-based SDT procedure is ongoing and an msgB-ResponseWindow is running.

Fallback Action 5: Cancel a triggered BSR and/or PHR procedure.

In some implementations, the triggered BSR procedure may be canceled.

In some implementations, the triggered PHR procedure may be canceled.

Fallback Action 6: Perform BWP switching.

In some implementations, the UE may switch to the initial (UL/DL) BWP.

Fallback Action 7: Consider TA as invalid.

In some implementations, upon considering that the TA as invalid, the UE may discard a stored NTA value. The NTA value may be derived by the UE from the value indicated in the TA command MAC CE in the DL. The NTA value may be used by the UE to perform UL time adjustment when performing a UL transmission.

In some implementations, upon considering that the TA as invalid, the UE may release/discard a timealignmenttimer. Moreover, the RRC layer of the UE may indicate to the MAC layer of the UE that the timealignmenttimer has been released/discarded.

Fallback Action 8: Flush specific buffer(s).

In some implementations, the specific buffer(s) may be HARQ buffer(s) (corresponding to the HARQ process(es) of a CG-based SDT configuration that is configured to the UE). The HARQ buffer(s) may be flushed if the fallback indication is received while a CG-based SDT procedure is ongoing.

In some implementations, the specific buffer(s) may be soft buffer(s) (corresponding to DL HARQ process(es) that may be used while the UE is in the RRC_INACTIVE state).

In some implementations, the specific buffer may be an MSGA/MSG3 buffer.

In some implementations, the MSGA buffer may be flushed if the fallback indication is received while a 2-step RA-based SDT procedure is ongoing.

In some implementations, the MSG3 buffer may be flushed if the fallback indication is received while a 4-step RA-based SDT procedure is ongoing.

Fallback Action 9: Perform MAC reset

In some implementations, once the UE determines to perform MAC reset after receiving the fallback indication, the RRC layer of the UE may indicate to the MAC layer of the UE to perform (partial) MAC reset.

Fallback Action 10: Stop/terminate the UL resource repetition transmission.

In some implementations, a specific number of repetitions of a TB for a dynamic UL grant, rep_dynamic, may be configured, by the network, via dedicated signaling (e.g., included in the DCI that schedules the dynamic UL grant, included in the RRCRelease message, etc.) and/or broadcast system information (e.g., included in SIB). If rep_dynamic is larger than 1, the UE may, after performing the initial transmission of the TB on a UL resource scheduled by a dynamic UL grant, perform rep_dynamic−1 retransmissions of the same TB. Here, the initial transmission and retransmission(s) of the TB may use the same HARQ process. The retransmission(s) of the TB may be performed without waiting for feedback from the previous transmission. The initial transmission and retransmission(s) of the same TB may correspond to the same transmission bundle.

In some implementations, if the fallback indication is received during a transmission bundle, the UE may stop/terminate (e.g., may not perform) the rest of the retransmission(s) within the transmission bundle.

In some implementations, a specific number of repetitions of a TB within a bundle of a configured UL grant, rep_CG, may be configured, by the network, via dedicated signaling (e.g., included in the RRCRelease message, included in the ConfiguredGrantConfig of the configured UL grant in the RRCRelease message) and/or broadcast system information (e.g., included in SIB). If the rep_CG is larger than 1, the UE may, after performing the initial transmission of the TB on a CG PUSCH corresponding to a CG configuration, perform rep_CG−1 retransmissions of the same TB. Here, the initial transmission and retransmission(s) of the TB may use the same HARQ process. The retransmission(s) of the TB may be performed without waiting for feedback from the previous transmission. The initial transmission and retransmission(s) of the same TB may correspond to the same transmission bundle.

In some implementations, if the fallback indication is received during a transmission bundle, the UE may stop/terminate (e.g., may not perform) the rest of the retransmission(s) within the transmission bundle.

Fallback Action 11: Discard specific RNTI(s).

In some implementations, the specific RNTI value may be a CS-RNTI and/or a C-RNTI. The CS-RNTI and/or C-RNTI may be valid while a UE is in the RRC_INACTIVE state. The CS-RNTI and/or C-RNTI may be configured, by the network, via dedicated signaling (e.g., included in the RRCRelease message that is used to complete an CG-based/RA-based SDT procedure or used to transition the UE to from the RRC_CONNECTED state to the RRC_INACTIVE state).

Fallback Action 12: Stop/terminate a specific procedure(s).

In some implementations, the specific procedure may be a specific RRC procedure that is used for transmitting a specific RRC message to the network. The specific RRC message may be used to inform the network that the UE has available UL data at an LCH/RB that is not configured for an SDT. As such, the network may transition the UE from the RRC_INACTIVE state to the RRC_CONNECTED state after receiving the specific RRC message.

In some implementations, the specific RRC procedure may be initiated by the UE when UL data arrives (e.g., becomes available) at an LCH/RB that is not configured for an SDT. Moreover, the UE may only initiate the specific RRC procedure if UL data arrives (e.g., becomes available) at an LCH/RB while the UE is performing a (subsequent data transmission phase of a) CG-based/RA-based SDT procedure.

In some implementations, the specific RRC message may be mapped to DCCH/CCCH configured for the UE.

In some implementations, the specific RRC message may be mapped to SRB0/SRB1/SRB2/SRB3 configured for the UE.

In some implementations, if the fallback indication is received while the specific RRC procedure is ongoing, the UE may stop/terminate the specific RRC procedure. That is, if the UE has not transmitted the RRC message when the fallback indication is received, the UE may not transmit the specific RRC message to the network.

In some implementations, the specific procedure may be a CG-based SDT procedure.

In some implementations, if the fallback indication is received while a CG-based SDT procedure is ongoing, the UE may stop/terminate the CG-based SDT procedure. The UE may also reset the counter that is used to count the number of (initial/new) CG transmissions.

In some implementations, the specific procedure may be an RA-based SDT procedure.

In some implementations, if the fallback indication is received while a (2-step/4-step) RA-based SDT procedure is ongoing, the UE may stop/terminate the (2-step/4-step) RA-based SDT procedure.

In some implementations, if the fallback indication is received while a 2-step/4-step RA procedure, which is initiated as part of an RA-based SDT procedure, is ongoing, the UE may stop/terminate the 2-step/4-step RA procedure and/or the RA-based SDT procedure.

In some implementations, if the fallback indication is received while a 2-step/4-step RA procedure, which is initiated as part of an RA-based SDT procedure, is ongoing, the UE may reset msgATransMax/preambleTransMax and/or selects normal RA preamble/PRACH resource for the next preamble transmission. Moreover, the RA procedure may be considered unsuccessfully completed and/or the MAC entity of the UE may indicate an RA problem (e.g., send an RA problem indication) to the RRC layer of the UE.

Fallback Action 13: Initiate a non-SDT procedure(s).

In some implementations, the non-SDT procedure may be referred to as a normal RRC connection resume procedure.

In some implementations, if the fallback indication is received, the UE may initiate a normal RRC connection resume procedure to transmit an RRCResumeRequest message. Moreover, a normal RA procedure may be initiated to transmit the RRCResumeRequest message.

In some implementations, the non-SDT procedure may be referred to as a specific RRC procedure (as described above).

In some implementations, if the fallback indication is received, the UE may initiate a specific RRC procedure to transmit a specific RRC message to the network.

In some implementations, the non-SDT procedure may be referred to as a normal RA procedure.

Fallback Action 14: Initiate a specific RRC action(s).

In some implementations, the specific RRC actions may include:
releasing the default MAC cell group configuration;
re-establishing RLC entities for SRB1;
suspending SRBs and DRBs except SRB0;
moving to RRC_IDLE state; and/or
performing cell (re)selection.

Figure 4:
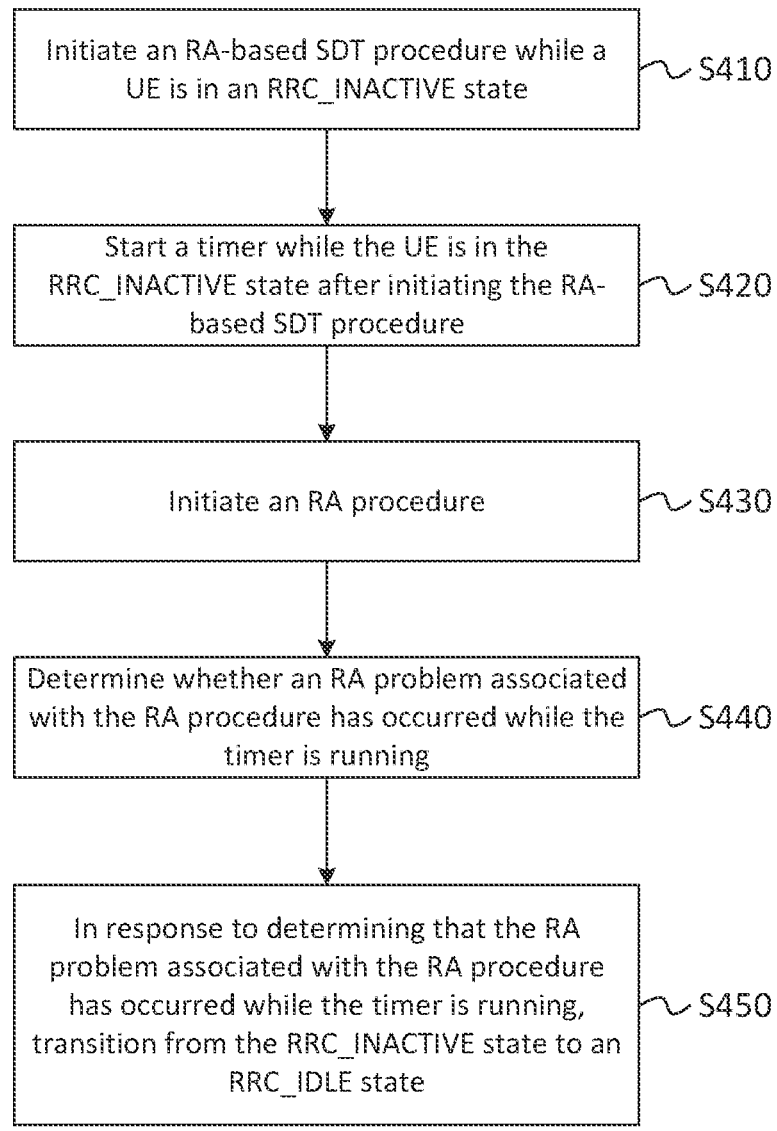
FIG. 4 is a flowchart illustrating a method performed by a UE for handling an RA failure while in an RRC inactive state, according to an example implementation of the present disclosure.

FIG. 4 is a flowchart illustrating a method performed by a UE for handling an RA failure while in an RRC inactive state, according to an example implementation of the present disclosure.

Referring to FIG. 4, although steps S410 to S450 are illustrated as separate steps represented as independent blocks, these separately illustrated actions should not be construed as necessarily order dependent. The order in which the steps are performed in FIG. 4 is not intended to be construed as a limitation, and any number of the disclosed blocks may be combined in any order to implement the method, or an alternate method. For example, in some implementations, steps S410 and step S430 may be performed together. As another example, in some implementations, step S430 may be performed prior to step S420.

The method for the RA-based SDT procedure illustrated in FIG. 4 may be consistent with at least part of the procedure for the RA-based SDT illustrated in FIG. 3 and descriptions of FIG. 4 may be read with reference to FIG. 3 and previously associated paragraphs. It should be noted that the method illustrated in FIG. 4 may be performed by a UE for communicating with a network (e.g., a base station) as illustrated in FIG. 3.

Referring to FIG. 4, in step S410, the UE may initiate an RA-based SDT procedure while the UE is in an RRC_INACTIVE state.

In some implementations, when a certain condition is met, a UE in the RRC_INACTIVE state may initiate an RA-based SDT procedure. For example, as described above (e.g., with reference to FIG. 3) when a UE in the RRC_INACTIVE state has UL data available for transmission, the UE may initiate an RA-based SDT procedure.

In step S420, the UE may start a timer while the UE is in the RRC_INACTIVE state after initiating the RA-based SDT procedure. In step S430, the UE may initiate an RA procedure.

In some implementations, although step S420 is shown to be performed prior to step S430, step S430 may be performed prior to step S420.

In some implementations, the RA-based SDT procedure initiated in step S410 may include an RA procedure. Specifically, during the RA-based SDT procedure, an RA procedure may be initiated. In some implementations, the RA procedure may be initiated as part of the RA-based SDT procedure by selecting a PRACH resource for the RA procedure (e.g., RA preamble with small data indication as shown in step S310 of FIG. 3). In some implementations, the RA procedure may be initiated as a normal RA procedure (e.g., RA preamble without the small data indication).

It should be noted that, in some implementations, the RA procedure initiated in step S430 may indicate an RA procedure as part of the RA-based SDT procedure, which is initiated by transmitting an RA preamble with a small data indication. In some implementations, the RA procedure initiated in step S430 may indicate a normal RA procedure, which is initiated by transmitting an RA preamble without a small data indication.

It should also be noted that, in a case that the RA procedure initiated in step S430 is initiated by transmitting an RA preamble with a small data indication (e.g., RA procedure), step S430 may be performed at other times (e.g., before or after the step S420). In a case that the RA procedure initiated in step S430 is initiated by transmitting an RA preamble without small data indication, step S430 may be performed at other times (e.g., before or after the step S420) during the RA-based SDT procedure.

After transmitting the RA preamble (e.g., with the small data indication), the UE may transmit an RRC message through MSG3 (when a 4-step RA type is selected) or MSGA (when a 2-step RA type is selected), as shown in step S320 of FIG. 3. The RRC message may be an RRC resume request message or an RRC resume request 1 message.

In some implementations, a timer may start upon the transmission of the RRC resume request message or the RRC resume request 1 message when the resume procedure is initiated for the SDT. For example, the timer may start upon step S320 of FIG. 3 is performed.

In some implementations, the timer may be used for determining whether an (RA-based) SDT procedure is ongoing. Specifically, in a case that the timer is running, the UE may determine that the (RA-based) SDT procedure is ongoing; and in a case that the timer is not running or expired, the UE may determine that the (RA-based) SDT procedure has been stopped/terminated/failed. In other words, the UE may consider the (RA-based) SDT procedure to be not ongoing if it finds that the timer is not running.

In some implementations, an expiry of the timer means that the RA-based SDT procedure is stopped/terminated/failed, the UE may perform at least one of the fallback actions upon the expiry of the timer. For example, the UE may transition from the RRC_INACTIVE state to the RRC_IDLE state upon the expiry of the timer.

In some implementations, the timer may stop upon a reception of at least one of an RRC resume message, an RRC setup message, an RRC release message, and an RRC reject message.

In some implementations, the timer may be an SDT failure detection timer.

Referring back to FIG. 4, in step S440, the UE may determine whether an RA problem associated with the RA procedure has occurred while the timer is running.

In some implementations, an RA procedure may be initiated by transmitting an RA preamble (e.g., step S310 of FIG. 3) and may be completed by receiving an MSG4/MSGB (e.g., step S330 of FIG. 3) (with successful contention resolution). However, some problems may occur in the RA procedure such that the RA procedure may not successfully complete.

In some implementations, the RA preamble may be transmitted several times before an RAR/MSGB is received. In one example, upon transmission of MSG1 (e.g., RA preamble)/MSGA (e.g., RA preamble and MSGA payload) in a 4-step/2-step RA procedure during an RA-based SDT procedure, the UE may monitor RAR/MSGB while an RA-ResponseWindow msgB-ResponseWindow is running. If the UE does not successfully receive the RAR/MSGB while the ra-ResponseWindow msgB-ResponseWindow is running, the UE may perform MSG1 (e.g., RA preamble)/MSGA (e.g., RA preamble and MSGA payload) transmission again after the ra-ResponseWindow msgB-ResponseWindow expires. In one example, upon transmission of a MSG3/MSGA in a 4-step/2-step RA procedure during an RA-based SDT procedure, the UE may receive an MSG4/MSGB including a contention resolution ID. However, if the contention resolution ID received in MSG4/MSGB does not match the CCCH data transmitted in MSG3/MSGA, the UE may consider the contention resolution unsuccessful, and may perform MSG1/MSGA transmission again. In such a case, the UE may determine whether a number of the RA preamble transmissions during the RA procedure exceeds a threshold (e.g., preambleTransMax). If the number of the RA preamble transmissions exceeds the threshold, the UE may determine that an RA problem associated with the RA procedure has occurred.

In some implementations, the MAC entity of the UE may send an RA problem indication to the RRC layer of the UE in a case that an RA problem associated with the RA procedure occurs. In some implementations, the MAC entity of the UE may send an RA problem indication to the RRC layer of the UE in a case that the number of times of transmitting the RA preamble exceeds the threshold.

After determining that the RA problem associated with the RA procedure has occurred, the UE may further check whether the timer is running, in order to determine whether the RA problem associated with the RA procedure has occurred while the timer is running.

It should be noted that, the UE determining that the RA problem associated with the RA procedure has occurred while the timer is running means that the RA procedure may fail during an RA-based SDT procedure.

Referring back to FIG. 4, in step S450, in response to determining that the RA problem associated with the RA procedure has occurred while the timer is running, the UE may transition from the RRC_INACTIVE state to the RRC_IDLE state.

Specifically, in a case that the UE determines that an RA problem occurs during an RA-based SDT procedure, the UE may perform at least one of the fallback actions.

In some implementations, in a case that the UE determines that the RA problem occurs during an RA-based SDT procedure, the UE may determine that the RA-based SDT procedure has failed.

In some implementations, in a case that the UE determines that the RA problem occurs during an RA-based SDT procedure, the MAC entity of the UE may send an RA-based SDT procedure failure indication to the RRC layer of the UE.

In some implementations, in a case that the UE determines that the RA-based SDT procedure has failed, the UE may transition from the RRC_INACTIVE state to the RRC_IDLE state.

According to the method provided with reference to FIG. 4, as long as an RA problem associated with an RA procedure occurs during the RA-based SDT procedure, the UE may stop/terminate the RA-based SDT procedure and transition from the RRC_INACTIVE state to the RRC_IDLE state. As such, the UE may not need to perform PDCCH monitoring during the subsequent data transmission phase. As a result, the power consumption of the UE may be reduced.

Figure 5:
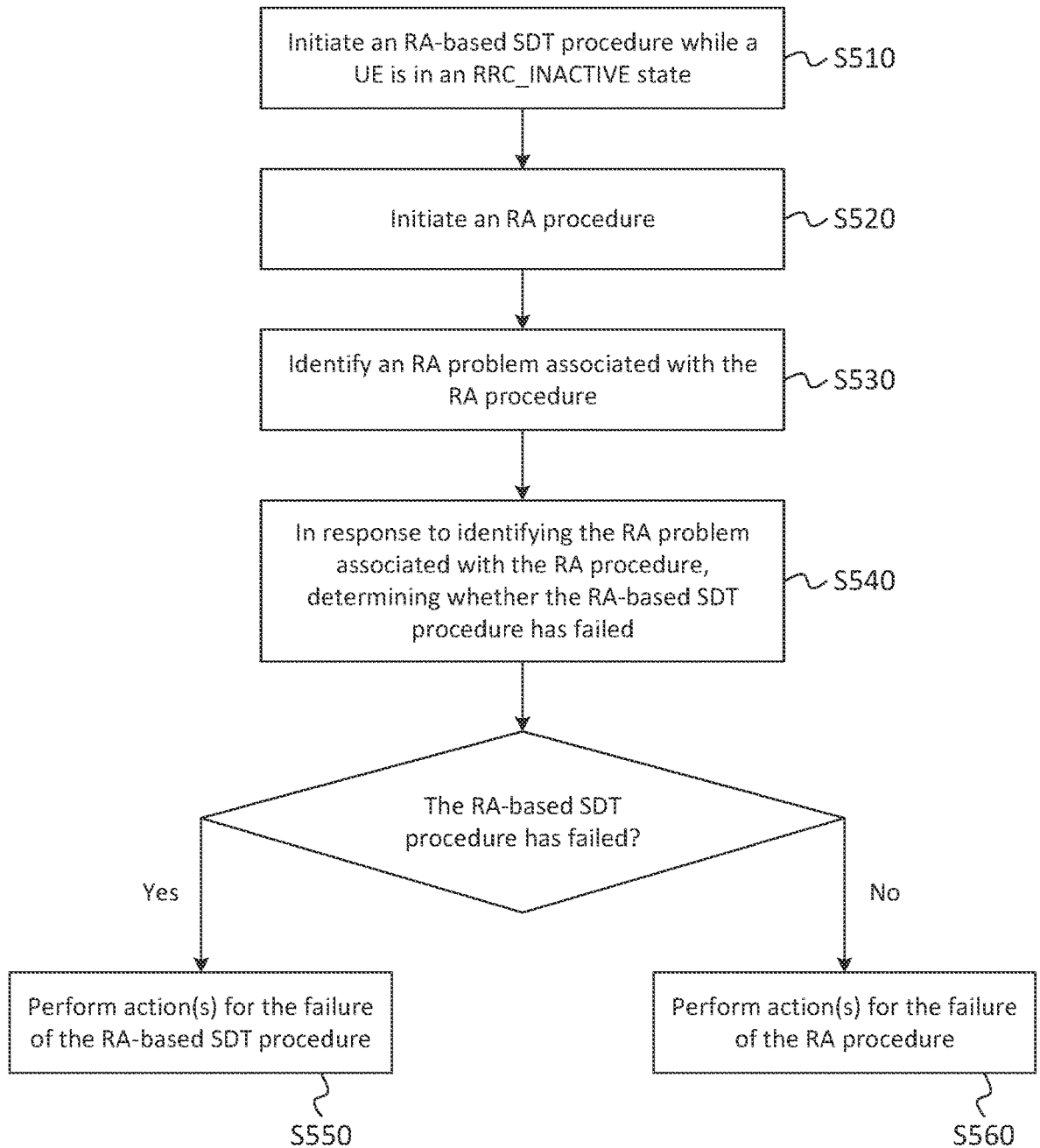
FIG. 5 is a flowchart illustrating a method performed by a UE for handling an RA failure while in an RRC inactive state, according to an example implementation of the present disclosure.

FIG. 5 is a flowchart illustrating a method performed by a UE for handling an RA failure while in an RRC inactive state, according to an example implementation of the present disclosure.

Referring to FIG. 5, although steps S510 to S560 are illustrated as separate steps represented as independent blocks, these separately illustrated actions should not be construed as necessarily order dependent. The order in which the steps are performed in FIG. 5 is not intended to be construed as a limitation, and any number of the disclosed blocks may be combined in any order to implement the method, or an alternate method.

The method for the RA-based SDT procedure illustrated in FIG. 5 may be consistent with at least part of the procedure for the RA-based SDT illustrated in FIG. 3 and descriptions of FIG. 5 may be read with reference to FIG. 3 and previous associated paragraphs. It should be noted that the method illustrated in FIG. 5 may be performed by a UE for communicating with a network (e.g., a base station) as illustrated in FIG. 3.

Referring to FIG. 5, in step S510, the UE may initiate an RA-based SDT procedure while the UE is in an RRC_INACTIVE state. In step S520, the UE may initiate an RA procedure.

Steps S510 and S520 are similar to steps S410 and S430 described with reference to FIG. 4 above, therefore details of steps S510 and S520 are not described herein again for the sake of brevity.

In some implementations, the timer described with reference to FIG. 4 above may be started upon a transmission of the RRC resume request message or the RRC resume request 1 message when a resume procedure is initiated for an SDT. Details of the timer are not repeated herein.

Referring to FIG. 5, in step S530, the UE may identify (detect) an RA problem associated with the RA procedure.

As described above, some problems may occur in the RA procedure such that the RA procedure may not successfully complete. Some example RA problems are illustrated with reference to FIG. 4 above, and as such, details of the RA problem are not described here again for the sake of brevity.

Referring to FIG. 5, in step S540, in response to identifying the RA problem associated with the RA procedure, the UE may further determining whether the RA-based SDT procedure has failed.

In some implementations, the UE may determine whether the RA problem associated with the RA procedure has occurred during an RA-based SDT procedure. In a case that the RA problem of the RA procedure occurs during an RA-based SDT procedure, the UE may determine that the RA-based SDT procedure has failed. In other words, a failure of an RA-based SDT procedure is identified or detected if the UE finds that the RA problem occurs during the RA-based SDT procedure.

In some implementations, the UE may check whether the timer (e.g., used for determining whether an (RA-based) SDT procedure is ongoing as described above) is running. In a case that the timer is running while the RA problem is detected, a failure of the RA-based SDT procedure may be detected.

In some implementations, an expiry of the timer means that the RA-based SDT procedure is stopped/terminated/failed, therefore the UE may determine the failure of the RA-based SDT procedure upon the expiry of the timer.

In some implementations, in a case that the timer is not running (e.g., not started) when the RA problem is detected, the failure of the RA-based SDT procedure is considered to be undetected.

In some implementations, the MAC entity of the UE may send an RA-based SDT procedure failure indication to the RRC layer of the UE in a case that the failure of the RA-based SDT procedure is detected.

In a case that the failure of the RA-based SDT procedure is detected, step S550 is entered; in a case that the failure of the RA-based SDT procedure is undetected, step S560 is entered.

Referring back to FIG. 5, in step S550, in a case that the failure of the RA-based SDT procedure is detected (e.g., determining that the RA-based SDT procedure has failed), the UE may perform at least one of the actions for the failure of the RA-based SDT procedure as described above.

In some implementations, the actions for the failure of the RA-based SDT procedure may include one or more of, for example but not limited to, the fallback actions 1 to 14.

In some implementations, the actions for the failure of the RA-based SDT procedure may include transitioning from the RRC_INACTIVE state to the RRC_IDLE state.

In some implementations, the actions for the failure of the RA-based SDT procedure may include stopping the RA procedure.

In some implementations, the actions for the failure of the RA-based SDT procedure may include terminating the RA-based SDT procedure.

Referring to FIG. 5, in step S560, in a case that determining that the RA-based SDT procedure is not detected (e.g., determining that the RA-based SDT procedure has not failed), the UE may perform at least one of the actions for the failure of the RA procedure.

In some implementations, the actions for the failure of the RA procedure may be different from the actions for the failure of the RA-based SDT procedure.

In some implementations, the actions for the failure of the RA procedure may include at least one of detection of MCG RLF, initiation the connection re-establishment procedure, initiate the MCG failure information procedure to report MCG RLF, etc.

According to the method provided with reference to FIG. 5, once the UE detects that an RA procedure has failed, the UE may further determines whether an ongoing RA-based SDT procedure has also failed, and the UE may transition from the RRC_INACTIVE state to the RRC_IDLE state when a failure of the ongoing RA-based SDT procedure is detected. As such, the UE may not need to perform PDCCH monitoring during the subsequent data transmission phase. The power consumption of the UE may also be reduced as the result.

Figure 6:
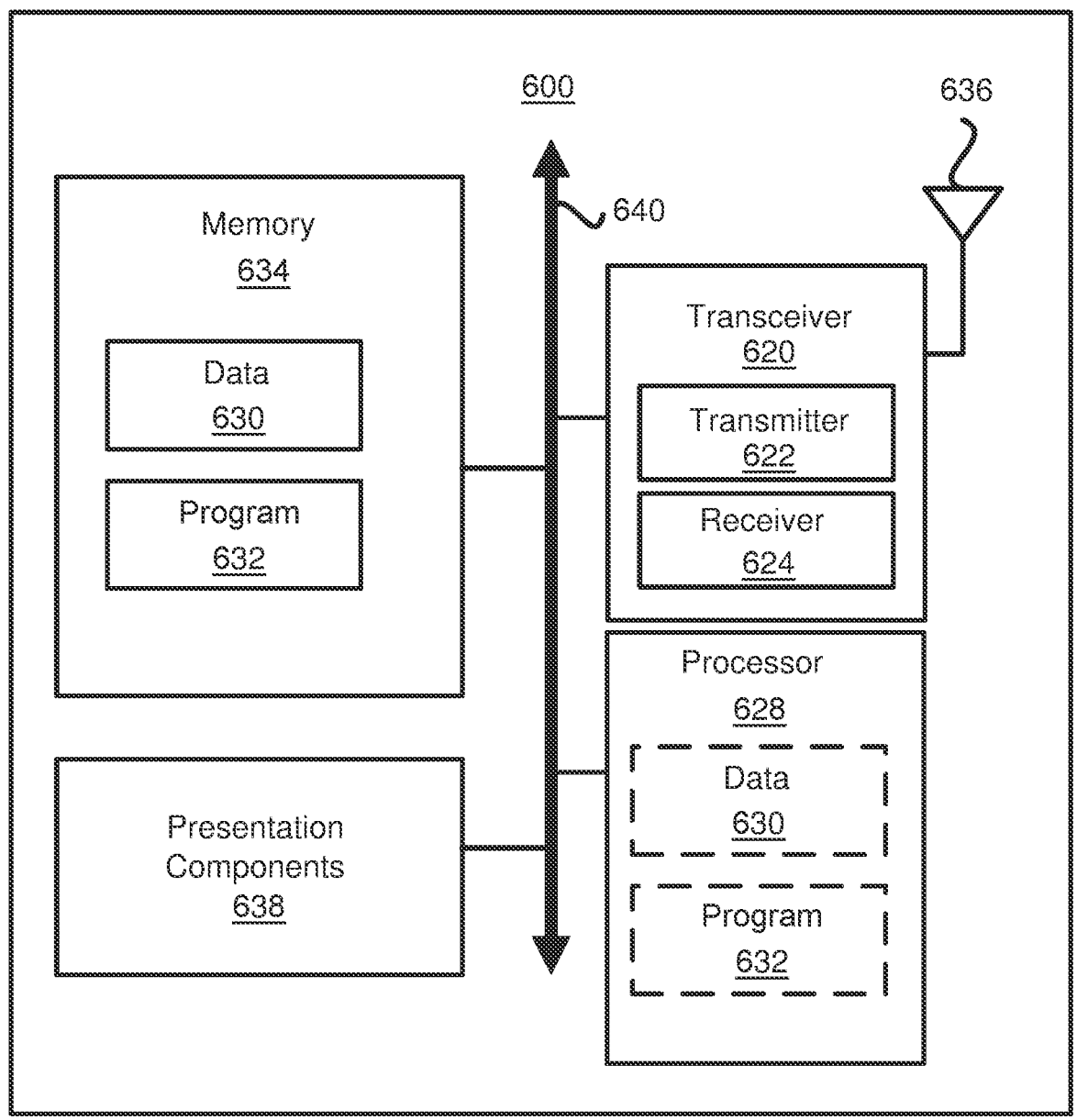
FIG. 6 is a block diagram illustrating a node for wireless communication, according to an example implementation of the present disclosure.

FIG. 6 is a block diagram illustrating a node for wireless communication, according to an example implementation of the present application. As illustrated in FIG. 6, the node 600 may include a transceiver 620, a processor 628, a memory 634, one or more presentation components 638, and at least one antenna 636. The node 600 may also include an RF spectrum band module, a BS communications module, a network communications module, and a system communications management module, Input/Output (I/O) ports, I/O components, and a power supply (not explicitly illustrated in FIG. 6). Each of these components may be in communication with each other, directly or indirectly, over one or more buses 640. In some implementations, the node 600 may be a UE or a BS that performs various functions described herein, for example, with reference to FIGS. 1 through 5.

The transceiver 620 having a transmitter 622 (e.g., transmitting/transmission circuitry) and a receiver 624 (e.g., receiving/reception circuitry) may be configured to transmit and/or receive time and/or frequency resource partitioning information. In some implementations, the transceiver 620 may be configured to transmit in different types of subframes and slots, including, but not limited to, usable, non-usable and flexibly usable subframes and slot formats. The transceiver 620 may be configured to receive data and control channels.

The node 600 may include a variety of computer-readable media. Computer-readable media can be any available media that can be accessed by the node 600 and include both volatile (and non-volatile) media and removable (and non-removable) media. By way of example, and not limitation, computer-readable media may include computer storage media and communication media. Computer storage media may include both volatile (and/or non-volatile) and removable (and/or non-removable) media implemented according to any method or technology for storage of information such as computer-readable instructions, data structures, program modules or data.

Computer storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer storage media do not include a propagated data signal. Communication media may typically embody computer-readable instructions, data structures, program modules, or other data in a modulated data signal such as a carrier wave or other transport mechanisms and include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared, and other wireless media. Combinations of any of the above should also be included within the scope of computer-readable media.

The memory 634 may include computer storage media in the form of volatile and/or non-volatile memory. The memory 634 may be removable, non-removable, or a combination thereof. For example, the memory 602 may include solid-state memory, hard drives, optical-disc drives, etc. As illustrated in FIG. 6, the memory 634 may store computer-readable and/or computer-executable instructions 632 (e.g., software code(s) or computer-executable program(s)) that are configured to, when executed, cause the processor 628 to perform various functions described herein, for example, with reference to FIGS. 1 through 5. Alternatively, the instructions 632 may not be directly executable by the processor 628 but may be configured to cause the node 600 (e.g., when compiled and executed) to perform various functions described herein.

The processor 628 (e.g., having processing circuitry) may include an intelligent hardware device, a Central Processing Unit (CPU), a microcontroller, an ASIC, etc. The processor 628 may include memory. The processor 628 may process the data 630 and the instructions 632 received from the memory 634, and information through the transceiver 620, the baseband communications module, and/or the network communications module. The processor 628 may also process information to be sent to the transceiver 620 for transmission through the antenna 636, to the network communications module for transmission to a CN.

One or more presentation components 638 may present data indications to a person or other devices. Examples of presentation components 638 may include a display device, speaker, printing component, vibrating component, etc.

From the present disclosure, it is manifested that various techniques may be used for implementing the concepts described in the present application without departing from the scope of those concepts. Moreover, while the concepts have been described with specific reference to certain implementations, a person of ordinary skill in the art would recognize that changes may be made in form and detail without departing from the scope of those concepts. As such, the described implementations are to be considered in all respects as illustrative and not restrictive. It should also be understood that the present disclosure is not limited to the particular implementations described above. Still, many rearrangements, modifications, and substitutions are possible without departing from the scope of the present disclosure.

What is claimed is:

1. A method performed by a User Equipment (UE), the method comprising:
    initiating a random access (RA)-based small data transmission (SDT) procedure while the UE is in a radio resource control (RRC) inactive state;
    starting a timer while the UE is in the RRC inactive state after initiating the RA-based SDT procedure;
    initiating an RA procedure;
    determining whether an RA problem associated with the RA procedure has occurred while the timer is running; and
    in response to determining that the RA problem has occurred while the timer is running, transitioning from the RRC inactive state to an RRC idle state.

2. The method of claim 1, further comprising:
    stopping the timer when receiving at least one of an RRC resume message, an RRC setup message, an RRC release message, and an RRC reject message.

3. The method of claim 1, wherein starting the timer comprises:
    starting the timer upon transmitting at least one of an RRC resume request message and an RRC resume request 1 message, and when a resume procedure is initiated for an SDT.

4. The method of claim 3, wherein transmitting the at least one of the RRC resume request message and the RRC resume request 1 message comprises transmitting the at least one of the RRC resume request message and the RRC resume request 1 message with an Msg3 payload or an MSGA payload.

5. The method of claim 1, further comprising:
    transitioning from the RRC inactive state to an RRC idle state upon an expiry of the timer.

6. The method of claim 1, wherein determining whether the RA problem associated with the RA procedure has occurred while the timer is running comprises:
   determining whether a number of RA preamble transmissions during the RA procedure exceeds a threshold while the timer is running.

7. The method of claim 6, further comprising:
   sending an RA problem indication from a MAC layer of the UE to an RRC layer of the UE in a case that the number of RA preamble transmissions exceeds the threshold.

8. A User Equipment (UE), comprising:
   at least one processor; and
   at least one memory coupled to the at least one processor, the at least one memory storing a set of computer-executable instructions that, when executed by the at least one processor, causes the LIE to:
   initiate a random access (RA)-based small data transmission (SDT) procedure while the UE is in a radio resource control (RRC) inactive state;
   start a timer while the UE is in the RRC inactive state after initiating the RA-based SDT procedure;
   initiate an RA procedure;
   determine whether an RA problem associated with the RA procedure has occurred while the timer is running; and
   in response to determining that the RA problem associated with the RA procedure has occurred while the timer is running, transition from the RRC inactive state to an RRC idle state.

9. The UE of claim 8, wherein the set of computer-executable instructions, when executed by the at least one processor, further causes the UE to:
   stop the timer when receiving at least one of an RRC resume message, an RRC setup message, an RRC release message, and an RRC reject message.

10. The UE of claim 8, wherein starting the timer comprises:
    starting the timer upon transmitting at least one of an RRC resume request message and an RRC resume request 1 message and when a resume procedure is initiated for an SDT.

11. The UE of claim 10, wherein transmitting the at least one of the RRC resume request message and the RRC resume request 1 message comprises transmitting the at least one of the RRC resume request message and the RRC resume request 1 message with an Msg3 payload or an MSGA payload.

12. The UE of claim 8, wherein the set of computer-executable instructions, when executed by the at least one processor, further causes the UE to:
    transition from the RRC inactive state to an RRC idle state upon an expiry of the timer.

13. The UE of claim 8, wherein determining whether the RA problem associated with the RA procedure has occurred while the timer is running comprises:
    determining whether a number of RA preamble transmissions during the RA procedure exceeds a threshold while the timer is running.

14. The UE of claim 13, wherein the set of computer-executable instructions, when executed by the at least one processor, further causes the UE to:
    send an RA problem indication from a MAC layer of the UE to an RRC layer of the UE in a case that the number of RA preamble transmissions exceeds the threshold.

* * * * *